United States Patent [19]
Ogo et al.

[11] Patent Number: 5,849,826
[45] Date of Patent: Dec. 15, 1998

[54] SEMIAROMATIC POLYAMIDES, PROCESSES FOR PREPARING THE SAME AND COMPOSITIONS CONTAINING THE SAME

[75] Inventors: Yoshimasa Ogo; Hidetatsu Murakami; Kunihiro Oouchi; Masaru Sudou; Yoshikatsu Amimoto; Satoshi Omori; Kenji Wakatsuru, all of Kuga-gun; Ryuichi Hayashi; Masahiro Nozaki, both of Utsunomiya, all of Japan

[73] Assignee: Mitsui Petrochemical Industries, Ltd., Tokyo, Japan

[21] Appl. No.: 860,250

[22] PCT Filed: Oct. 24, 1996

[86] PCT No.: PCT/JP96/03107

§ 371 Date: Jun. 25, 1997

§ 102(e) Date: Jun. 25, 1997

[87] PCT Pub. No.: WO97/15610

PCT Pub. Date: May 1, 1997

[30] Foreign Application Priority Data

Oct. 27, 1995 [JP] Japan .................................. 7-280997

[51] Int. Cl.$^6$ .......................... C08G 69/06; C08G 69/26; C08G 69/28; C08G 69/30
[52] U.S. Cl. .......................... 524/410; 524/409; 524/411; 524/607; 525/66; 525/183; 525/432; 528/324; 528/329.1; 528/338; 528/339; 528/491
[58] Field of Search .................. 528/324, 329.1, 528/338, 339, 491; 525/66, 183, 432; 524/607, 409, 410, 411

[56] References Cited

U.S. PATENT DOCUMENTS 4,816,557   3/1989   Pipper et al. .
4,891,420   1/1990   Martin et al. .
4,978,743   12/1990  Selbeck et al. .
5,081,222   1/1992   Reimann et al. .
5,115,010   5/1992   Sakai et al. .
5,504,146   4/1996   Goetz et al. .

FOREIGN PATENT DOCUMENTS 0 212 699   3/1987   European Pat. Off. .
0 288 269   10/1988  European Pat. Off. .
0 348 821   1/1990   European Pat. Off. .
74011756    3/1974   Japan .
60-166324   8/1985   Japan .
61-283654   12/1986  Japan .
63-260951   10/1988  Japan .
2-24322     1/1990   Japan .
3-231965    10/1991  Japan .
3-234764    10/1991  Japan .
4-50230     2/1992   Japan .
4-108855    4/1992   Japan .
5-98152     4/1993   Japan .
5-331281    12/1993  Japan .

*Primary Examiner*—Patricia A. Short
*Attorney, Agent, or Firm*—Sherman and Shalloway

[57] ABSTRACT

The semiaromatic polyamide of the invention comprises 40 to 90% by mol of (A) recurring units derived from terephthalic acid and an aliphatic diamine of 4 to 12 carbon atoms, 0 to 50% by mol of (B) recurring units derived from isophthalic acid and an aliphatic diamine of 4 to 12 carbon atoms, 0 to 60% by mol of (C) recurring units derived from an aliphatic dicarboxylic acid of 4 to 18 carbon atoms and an aliphatic diamine of 4 to 12 carbon atoms and 0 to 50% by mol of (D) recurring units derived from a lactam or an aminocarboxylic acid of 6 to 20 carbon atoms, and has a content of boiling water-soluble components (MO components) of not more than 0.25% by weight. The semiaromatic polyamide has a low content of the MO components, so that mold contamination hardly brought about in the molding process, and also molded articles of good heat resistance can be produced.

31 Claims, 2 Drawing Sheets

SEMIAROMATIC POLYAMIDES, PROCESSES FOR PREPARING THE SAME AND COMPOSITIONS CONTAINING THE SAME

TECHNICAL FIELD

The present invention relates to semiaromatic polyamides capable of efficiently producing molded articles without bringing about contamination of a mold in the production of the molded articles and to processes for preparing the semiaromatic polyamides.

The present invention also relates to semiaromatic polyamide compositions containing the semiaromatic polyamides.

BACKGROUND ART

Various proposals relating to processes for preparing semiaromatic polyamides have been heretofore made. For example, Japanese Patent Laid-Open Publication No. 50230/1992 filed by the present applicant discloses a process for preparing a polyamide which comprises dicarboxylic acid units (a) composed of 50 to 90% by mol of terephthalic acid units and 0 to 40% by mol of units of other aromatic dicarboxylic acid than the terephthalic acid or units of a linear aliphatic dicarboxylic acid of 6 to 18 carbon atoms, and alkylenediamine units (b), and which has an intrinsic viscosity ($\eta$), as measured in a concentrated sulfuric acid at 30° C., of 0.5 to 3.0 dl/g.

In this connection, a composition comprising the above semiaromatic polyamide and a fibrous reinforcement is known to have high mechanical strength and heat resistance (see: Japanese Patent Laid-Open Publications No. 283654/1986, No. 249857/1989, No. 231965/1991 and No. 234764/1991).

A composition comprising the semiaromatic polyamide and a modified elastomeric polymer is known to have excellent heat resistance and impact resistance (see: Japanese Patent Laid-Open Publications No. 41318/1990, No. 108855/1992 and No. 98152/1993).

A composition comprising the semiaromatic polyamide and a flame retardant is known to be useful for connectors, etc. because of its excellent heat resistance and self-extinguishing properties (see: Japanese Patent Laid-Open Publications No. 260951/1988 and No. 138264/1990).

The polyamides mentioned above are prominently excellent in the heat resistance, mechanical properties and physiochemical properties, but when they are subjected to repeated injection molding operations using a mold, a white powder is sometimes precipitated inside the mold. As a result of analysis of the powder by the present inventors, the powder has been confirmed to be unreacted monomers and low oligomer components. When the polyamides are molded into electrical parts, particularly precision parts such as connectors, the unreacted monomers and low molecular weight oligomer components (referred to as "MO components" hereinafter) may have evil influence on the appearance of the molded articles or the dimensional accuracy thereof. Moreover, the MO components sometimes cause clogging of vent hole of the mold, and therefore the molding operation must be stopped to clean the mold.

Accordingly, there has been desired development of semiaromatic polyamides, which are excellent not only in mechanical strength such as rigidity, impact resistance and flexural strength but also in physiochemical properties such as flame retardance and heat resistance, which hardly bring about mold contamination in the molding process and clogging of vent hole of the mold, and which are capable of producing precision molded articles of good appearance.

It is, therefore, an object of the present invention to provide semiaromatic polyamides hardly bringing about mold contamination in the molding process and capable of producing molded articles of excellent properties and to provide processes for preparing the semiaromatic polyamides and compositions containing the semiaromatic polyamides.

It is another object of the invention to provide semiaromatic polyamide compositions having excellent heat resistance, mechanical strength and flame retardance and suitably used for producing precision parts such as connectors.

DISCLOSURE OF THE INVENTION

The semiaromatic polyamide of the present invention is a semiaromatic polyamide having (A) recurring units derived from terephthalic acid and an aliphatic diamine of 4 to 12 carbon atoms, and optionally, (B) recurring units derived from isophthalic acid and an aliphatic diamine of 4 to 12 carbon atoms, (C) recurring units derived from an aliphatic dicarboxylic acid of 4 to 18 carbon atoms and an aliphatic diamine of 4 to 12 carbon atoms and (D) recurring units derived from a lactam or an aminocarboxylic acid of 6 to 20 carbon atoms;

wherein said semiaromatic polyamide comprises 40 to 90% by mol of the recurring units (A), 0 to 50% by mol of the recurring units (B), 0 to 60% by mol of the recurring units (C) and 0 to 50% by mol of the recurring units (D), and the content of boiling water-soluble components (MO components) in the semiaromatic polyamide, as measured by immersing the polyamide in a boiling water at 100° C. for 24 hours, is not more than 0.25% by weight.

The first composition containing the semiaromatic polyamide of the invention is a semiaromatic polyamide composition comprising:

[I] the above-mentioned semiaromatic polyamide, and

[II] a fibrous reinforcement in an amount of 5 to 250 parts by weight based on 100 parts by weight of the semiaromatic polyamide.

The second composition containing the semiaromatic polyamide of the invention is a semiaromatic polyamide composition comprising:

[I] the above-mentioned semiaromatic polyamide in an amount of 99 to 30% by weight, and

[III] a modified elastomeric polymer and/or an ionomer resin, in an amount of 1 to 70% by weight.

It is preferable that the second composition further contains the fibrous reinforcement [II].

The third composition containing the semiaromatic polyamide of the invention is a semiaromatic polyamide composition comprising:

[I] the above-mentioned semiaromatic polyamide in an amount of 99 to 30% by weight, and

[IV] an aliphatic polyamide in an amount of 1 to 70% by weight.

The third semiaromatic polyamide composition may further contain the fibrous reinforcement [II] and/or the modified elastomeric polymer [III].

The fourth composition containing the semiaromatic polyamide of the invention is a semiaromatic polyamide composition comprising:

[I] the above-mentioned semiaromatic polyamide, and

[IV] a flame retardant.

It is desired that the flame retardant is composed of an organic flame retardant [VA], such as halogenated polystyrene and/or a condensate of halogenated phenol, and an inorganic auxiliary flame retardant [VB], such as sodium antimonate.

The fourth composition may be a semiaromatic polyamide composition comprising any one of the first to third compositions and the flame retardant.

The semiaromatic polyamide of the invention can be prepared by a process comprising the steps of bringing terephthalic acid and optionally isophthalic acid and an aliphatic dicarboxylic acid of 4 to 18 carbon atoms into contact with an aliphatic diamine of 4 to 12 carbon atoms and optionally a lactam or an aminocarboxylic acid of 6 to 20 carbon atoms to prepare a semiaromatic polyamide, and then bringing the semiaromatic polyamide into contact with an aqueous medium. It is preferable that the contact of the semiaromatic polyamide with the aqueous medium is carried out in such a manner that the content of boiling water-soluble components (MO components) in the semiaromatic polyamide is decreased to not more than 0.25% by weight.

It is more preferable that the temperature of the water contacted with the semiaromatic polyamide is in the range of 50° to 100° C. and that the semiaromatic polyamide is contacted with the water for a period of 10 to 120 minutes. The intrinsic viscosity ($\eta$) of the semiaromatic polyamide, as measured in a concentrated sulfuric acid at 30° C., is preferably 0.7 to 2.0 dl/g.

The semiaromatic polyamide of the invention can also be prepared by a process comprising the steps of:

bringing terephthalic acid and optionally isophthalic acid and an aliphatic dicarboxylic acid of 4 to 18 carbon atoms into contact with an aliphatic diamine of 4 to 12 carbon atoms and optionally a lactam or an aminocarboxylic acid of 6 to 20 carbon atoms, to prepare a semiaromatic polyamide prepolymer comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0 to 50% by mol of (D) recurring units derived from the lactam or the aminocarboxylic acid of 6 to 20 carbon atoms, bringing the semiaromatic polyamide preolymer into contact with water, drying the semiaromatic polyamide prepolymer, and post polymerizing the dry semiaromatic polyamide prepolymer.

The post polymerization of the dry semiaromatic polyamide prepolymer generally proceeds when the semiaromatic polyamide prepolymer having been melted by heating is kneaded with applying thereto a shear stress.

It is preferable that the temperature of the water contacted with the semiaromatic polyamide prepolymer in the post polymerization is in the range of 50° to 100° C. and that the semiaromatic polyamide prepolymer is contacted with the water for a period of 10 to 120 minutes. The intrinsic viscosity ($\eta$) of the semiaromatic polyamide prepolymer, as measured in a concentrated sulfuric acid at 30° C., is preferably 0.05 to 0.6 dl/g.

The intrinsic viscosity ($\eta$) of a semiaromatic polyamide resin obtained after the post polymerization of the semiaromatic polyamide prepolymer, as measured in a concentrated sulfuric acid at 30° C., is preferably 0.9 to 2.5 dl/g. It is preferable that the dicarboxylic acid is contacted with the diamine in the presence of a catalyst and a terminating reagent to prepare the semiaromatic polyamide prepolymer. The amount of the water contacted with the semiaromatic polyamide prepolymer is preferably 1 to 10 times as much as the volume of the prepolymer.

The semiaromatic polyamide of the invention can also be prepared by a process comprising the steps of:

bringing terephthalic acid and optionally isophthalic acid and an aliphatic dicarboxylic acid of 4 to 18 carbon atoms into contact with an aliphatic diamine of 4 to 12 carbon atoms and optionally a lactam or an aminocarboxylic acid of 6 to 20 carbon atoms to prepare a semiaromatic polyamide comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0 to 50% by mol of (D) recurring units derived from the lactam or the aminocarboxylic acid of 6 to 20 carbon atoms, and melt extruding the semiaromatic polyamide with supplying an inert gas into the polyamide resin.

It is preferable that the melt extrusion of the semiaromatic polyamide is carried out with supplying an inert gas into the polyamide resin in such a manner that then content of boiling water-soluble components (MO components) in the semiaromatic polyamide is decreased to not more than 0.25% by weight.

The semiaromatic polyamide having a decreased content of MO components can also be prepared by a process comprising the steps of:

bringing terephthalic acid and optionally isophthalic acid and an aliphatic dicarboxylic acid of 4 to 18 carbon atoms into contact with an aliphatic diamine of 4 to 12 carbon atoms and optionally a lactam or the aminocarboxylic acid of 6 to 20 carbon atoms or an aminocarboxylic acid, to prepare a semiaromatic polyamide prepolymer comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0 to 50% by mol of (D) recurring units derived from the lactam or the aminocarboxylic acid of 6 to 20 carbon atoms, subjecting the prepolymer to solid phase polymerization to prepare a semiaromatic polyamide prepolymer having an intrinsic viscosity ($\eta$) of 0.5 to 1.5 dl/g, and subjecting the prepolymer to melt polymerization to obtain a semiaromatic polyamide having an intrinsic viscosity ($\eta$) of 0.8 to 2.5 dl/g.

The MO components (boiling water-soluble components) referred to herein mean linear or cyclic monomers and low oligomers, and the content thereof is measured by the following way.

Measurement of content of MO component

To a 300 ml conical flask, 20 to 30 g of polyamide pellets having been vacuum dried at 110° C. for 24 hours to remove water content and 200 ml of distilled water are introduced, and they are stirred at 100° C. for 24 hours to effect extraction.

The extract is cooled and filtered. The filtrate is transferred into an eggplant type flask. On the other hand, over the pellets separated by filtration are poured 50 cc of water and then 50 cc of isopropanol, to wash the pellets and the flask.

Then, the resulting filtrate is transferred into the above-mentioned eggplant type flask and distilled to dryness under reduced pressure with removing the solvent, to obtain MO components. The MO components are weighed with tare by means of an accurate balance.

The content (% by weight) of the MO components is calculated by the following equation.

$$B/A \times 100 = X$$

B: weight of MO components
A: weight of polyamide pellets before test
X: content (%) of MO components According to the present invention, the content of the MO components (boiling water-soluble components) in the semiaromatic polyamide, as measured by the above-described way, is decreased. Therefore, when the semiaromatic polyamide is used to produce molded articles, mold contamination is hardly brought about and molded articles can be efficiently produced. Moreover, the resulting molded articles have excellent mechanical strength, heat resistance and flame retardance.

BEST MODE FOR CARRYING OUT THE INVENTION

Figure 1:
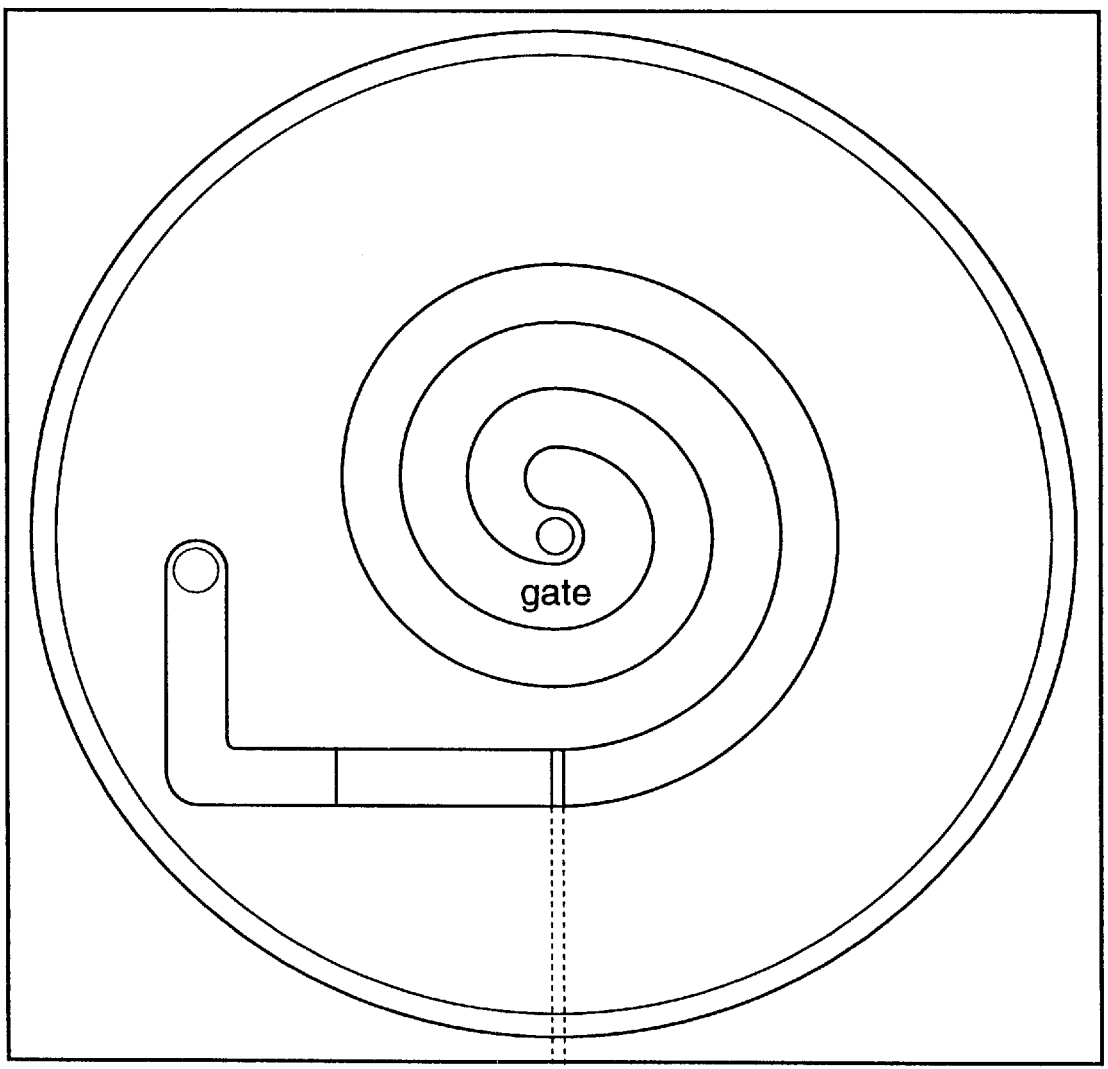
FIG. 1 shows a spiral mold used for evaluating mold contamination.
Figure 1:
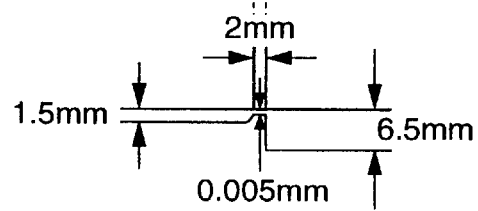

The semiaromatic polyamide, the processes for preparing the semiaromatic polyamide and the compositions containing the semiaromatic polyamide according to the invention are described in detail hereinafter.

Semiaromatic Polyamide

Polyamides are polymer compounds, which comprise recurring units derived from a dicarboxylic acid and diamine or additionally recurring units derived from lactam or an aminocarboxylic acid.

The dicarboxylic acid for forming the semiaromatic polyamide of the invention is an aromatic dicarboxylic acid or an aliphatic dicarboxylic acid.

Examples of the aromatic dicarboxylic acids include terephthalic acid, its derivatives (e.g., salts, halides, esters), other aromatic dicarboxylic acids than the terephthalic acid (e.g., isophthalic acid, naphthalenedicarboxylic acid) and their derivatives.

In addition to the aromatic dicarboxylic acids, also employable in the invention are aliphatic dicarboxylic acids and alicyclic dicarboxylic acids. In the event that the aliphatic dicarboxylic acids are used, they are preferably linear aliphatic dicarboxylic acids, more preferably linear aliphatic dicarboxylic acids having alkylene groups of 4 to 18 carbon atoms, particularly preferably those having alkylene groups of 4 to 12 carbon atoms. Examples of such linear aliphatic dicarboxylic acids include succinic acid (SA), adipic acid (AA), azelaic acid, sebacic acid and their derivatives. Of these aliphatic dicarboxylic acids, preferable are adipic acid and sebacic acid. Examples of the alicyclic dicarboxylic acids include tetracyclohexanedicarboxylic acid and its derivatives.

The "derivatives" referred to herein includes derivatives (e.g., salts, halides, esters) capable of forming recurring units by the reaction with diamines. The dicarboxylic acids and the diamines for use in the invention may have substituents such as alkyl groups, as far as the properties of the resulting polyamide resin are not marred. The meaning of each component used in the invention is the same as above.

The diamine, which constitutes the recurring units for forming the semiaromatic polyamide of the invention together with the dicarboxylic acid, is an aliphatic diamine of 4 to 25 carbon atoms, preferably that of 4 to 12 carbon atoms, or its derivative.

The aliphatic diamine may be a linear alkylenediamine or a branched chain alkylenediamine.

Examples of the alkylenediamines include linear alkylenediamines, such as 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane and 1,12-diaminododecane; and branched chain alkylenediamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,5-diamino-2-methylpentene, 1,2-diamino-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane and 1,9-diamino-5-methylnonane.

Of the linear and branched chain alkylenediamines, preferable are linear alkylenediamines, and particularly preferable are 1,6-diaminohexane (hexamethylenediamine, HMDA), 1,8-diaminooctane, 1,10-diaminodecane and 1,12-diaminododecane. These alkylenediamines can be used singly or in combination. Mixtures of the linear alkylenediamines as major components and small amounts of branched alkylenediamines, e.g., mixtures of 1,6-diaminohexane and 1,5-diamino-2-methylpentane, are also preferably employed. Derivatives of the diamines, such as salts thereof, are also available, as far as they are bonded to the dicarboxylic acids to form recurring units.

In the semiaromatic polyamide of the invention, a recurring unit represented by the following formula [I] is formed from the terephthalic acid (TA) and the diamine:

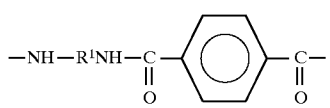

[I]

wherein $R^1$ is a divalent hydrocarbon group derived from the diamine used, preferably an alkylene group of 4 to 25 carbon atoms, particularly preferably an alkylene group of 4 to 12 carbon atoms.

When isophthalic acid (IA) is used together with the terephthalic acid (TA), a recurring unit represented by the following formula [II] is formed from the isophthalic acid and the diamine:

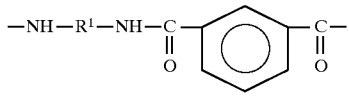

[II]

wherein $R^1$ is a divalent hydrocarbon group derived from the diamine used, preferably an alkylene group of 4 to 25 carbon atoms, particularly preferably an alkylene group of 4 to 12 carbon atoms.

When an aliphatic dicarboxylic acid is used together with the terephthalic acid, a recurring unit represented by the following formula [III] is formed from the aliphatic dicarboxylic acid and the diamine:

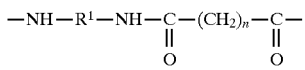

[III]

wherein $R^1$ is a divalent hydrocarbon group derived from the diamine used, preferably an alkylene group of 4 to 25 carbon atoms, particularly preferably an alkylene group of 4 to 12 carbon atoms, and n is a positive integer of usually 4 to 18, preferably 4 to 16, more preferably 4 to 12, particularly preferably 6 to 10.

The semiaromatic polyamide of the invention may have recurring units derived from a lactam or an aminocarboxylic acid of 6 to 12 carbon atoms, preferably 6 to 12 carbon atoms, in addition to the recurring units derived from the dicarboxylic acid and the diamine.

Examples of the lactams and the aminocarboxylic acids include ε-caprolactam, 6-aminocaproic acid, ξ-enantholactam, η-capryllactam, ω-laurolactam, ω-undecalactam, 11-aminoundecanoic acid and 12-aminododecanoic acid.

From the lactam or the aminocarboxylic acid, a recurring unit represented by the following formula [IV] is formed:

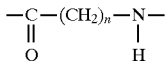

[IV]

wherein n is an integer of 4 to 20, preferably 6 to 20, particularly preferably 5 to 12.

In the semiaromatic polyamide of the invention, the quantity of the recurring units represented by the formulas [I] to [III] corresponds to the quantity of the dicarboxylic acid used, and the quantity of the recurring units represented by the formula [IV] corresponds to the quantity of the lactam or the aminocarboxylic acid used.

The semiaromatic polyamide of the invention is formed from polycondened units of:

the recurring units (A) of the formula [I] derived from the terephthalic acid and the aliphatic diamine of 4 to 12 carbon atoms, in amounts of 40 to 90% by mol, preferably 45 to 65% by mol, particularly preferably 45 to 55% by mol, the recurring units (B) of the formula [II] derived from the isophthalic acid and the aliphatic diamine of 4 to 12 carbon atoms, in amounts of 0 to 50% by mol, preferably 0 to 45% by mol, more preferably 5 to 45% by mol, particularly preferably 15 to 40% by mol, the recurring units (C) of the formula [III] derived from the aliphatic dicarboxylic acid of 4 to 18 carbon atoms and the aliphatic diamine of 4 to 12 carbon atoms, in amounts of 0 to 60% by mol, preferably 10 to 55% by mol, particularly preferably 45 to 55% by mol, and the recurring units (D) of the formula [IV] derived from the lactam or the aminocarboxylic acid of 6 to 20 carbon atoms, in amounts of 0 to 50% by mol, preferably 0 to 30% by mol, more preferably 5 to 30% by mol, particularly preferably 10 to 20% by mol.

The amounts of the dicarboxylic acids used for preparing the semiaromatic polyamide are as follows. When the total amount of the dicarboxylic acids is 100% by mol, the terephthalic acid can be used in an amount of 40 to 90% by mol, preferably 45 to 70% by mol; the aromatic dicarboxylic acid other than the terephthalic acid can be used in an amount of 0 to 50% by mol, preferably 5 to 45% by mol, more preferably 15 to 40% by mol; and the linear aliphatic dicarboxylic acid of 4 to 18 carbon atoms can be used in an amount of 0 to 60% by mol, preferably 10 to 55% by mol, particularly preferably 20 to 55% by mol.

The diamine is used in an amount almost equimolar with the dicarboxylic acid. In addition to the aliphatic diamine of 4 to 12 carbon atoms, a small amount of an alicyclic diamine is also employable in the invention. As the alicyclic diamine, a diamine having about 6 to 25 carbon atoms and having at least one alicyclic hydrocarbon ring is usually employed.

Examples of such alicyclic diamines include 1,3-diaminocyclohexane, 1,4-diaminocyclohexane, 1,3-bis(aminomethyl)cyclohexane, 1,4-bis(aminomethyl)cyclohexane, isophoronediamine, piperazine, 2,5-dimethylpiperazine, bis(4-aminocyclohexyl)methane, bis(4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis(4-aminocyclohexyl)-p-diisopropylbenzene, α,α'-bis(4-aminocyclohexyl)-m-diisopropylbenzene, α,α'-bis(4-aminocyclohexyl)-1,4-cyclohexane and α,α'-bis(4-aminocyclohexyl)-1,3-cyclohexane.

Of these alicyclic diamines, preferable are bis(aminomethyl)cyclohexane, bis(4-aminocyclohexyl)methane, 1,3-bis(aminocyclohexyl)methane, 1,3-bis(aminomethyl)cyclohexane and 4,4'-diamino-3,3'-dimethyldicyclohexylmethane. Of these, particularly preferable are bis(4-aminocyclohexyl)methane, 1,3-bis(aminocyclohexyl)methane and 1,3-bis(aminomethyl)cyclohexane. These diamines can be used singly or in combination.

In the present invention, the quantity of the recurring units derived from the lactam or the aminocarboxylic acid is in the range of usually 0 to 50% by mol, preferably 0 to 30% by mol.

Some preferred examples of the semiaromatic polyamides of the invention are given below.

(1) TA/AA/HMDA
  Component ratio: 60–45 mol %/40–55 mol %/100 mol %

(2) TA/IA/HMDA
  Component ratio: 85–60 mol %/15–40 mol %/100 mol %

(3) TA/IA/AA or SA/HMDA
Component ratio: 85–55 mol %/5–25 mol %/5–20 mol %/100 mol %

(4) TA/IA/6/HMDA
Component ratio: 85–55 mol %/5–25 mol %/5–20 mol %/100 mol %

(5) TA/6/HMDA
Component ratio: 80–50 mol %/15–50 mol %/85–50 mol %

(6) TA/AA/6/HMDA
Component ratio: 80–30 mol %/15–65 mol %/5–20 mol %/95–80 mol %

(7) TA/AA/HMDA/MPMDA
Component ratio: 100–40 mol %/60–0 mol %/20–80 mol %/80–20 mol %

In the above examples, "6" means units derived from ε-caprolactam, "TA" means units derived from terephthalic acid, "IA" means units derived from isophthalic acid, "AA" means units derived from adipic acid, "HMDA" means units derived from hexamethylenediamine, and "MPMDA" means units derived from 2-methylpentamethylenediamine.

The semiaromatic polyamide having a low content of the MO components according to the invention can be prepared by, for example, the following processes.

(1) A semiaromatic polyamide prepolymer is first prepared by a conventional process, then the prepolymer is treated with boiling water, and the prepolymer is further polymerized until the prepolymer becomes a high polymer.

(2) A high polymer of a semiaromatic polyamide is prepared by a conventional process, and then the high polymer is treated with boiling water.

The semiaromatic polyamide prepolymer can be prepared by, for example, adding the dicarboxylic acid (or its derivative) and the diamine (or its derivative) to an aqueous medium, further adding if necessary the lactam or the aminocarboxylic acid, and heating them in the presence of a catalyst.

In this reaction, the diamine is used in an amount of almost 1 mol based on 1 mol of the total of the aromatic dicarboxylic acids (total of the terephthalic acid and other aromatic dicarboxylic acids or linear aliphatic dicarboxylic acids optionally used). This reaction is usually conducted in an atmosphere of an inert gas. In general, the reactor is purged with an inert gas such as a nitrogen gas. The aqueous medium used herein is usually water, but it may contain organic solvents soluble in water, e.g., alcohols such as methanol and ethanol.

Examples of the catalysts employable for preparing the prepolymer in the invention include phosphoric acid, salts and ester compounds of the phosphoric acid, phosphorous acid, salts and ester compounds of the phosphorous acid, hypophosphorous acid, and salts and ester compounds of the hypophosphorous acid.

Specifically, there can be mentioned:

salts of phosphoric acid, such as potassium phosphate, sodium phosphate, calcium phosphate, magnesium phosphate, manganese phosphate, nickel phosphate and cobalt phosphate;

esters of phosphoric acid, such as methyl ester, ethyl ester, isopropyl ester, butyl ester, hexyl ester, isodecyl ester, octadecyl ester, decyl ester, stearyl ester and phenyl ester of phosphoric acid;

salts of phosphorous acid, such as potassium phosphite, sodium phosphite, calcium phosphite, magnesium phosphite, manganese phosphite, nickel phosphite and cobalt phosphite;

esters of phosphorous acid, such as methyl ester, ethyl ester, isopropyl ester, butyl ester, hexyl ester, isodecyl ester, octadecyl ester, decyl ester, stearyl ester and phenyl ester of phosphorous acid;

salts of phosphorous acid, such as potassium phosphite, magnesium phosphite, manganese phosphite, nickel phosphite and cobalt phosphite; and salts of hypophosphorous acid, such as potassium hypophosphite, sodium hypophosphite, calcium hypophosphite, vanadium hypophosphite, magnesium hypophosphite, manganese hypophosphite, nickel hypophosphite and cobalt hypophosphite.

These phosphorus type compounds can be used singly or in combination.

The phosphorus type compound is used in an amount of usually 0.01 to 5% by mol, preferably 0.02 to 2% by mol, based on the dicarboxylic acid.

In the above reaction, a terminating reagent is preferably employed. Examples of the terminating reagents include benzoic acid, alkali metal salts of benzoic acid and acetic acid. The terminating reagent is used in an amount of usually 0.01 to 5 mol, preferably 0.1 to 2 mol, based on 1 mol of the dicarboxylic acid. Adjustment of the amount of the terminating reagent makes it possible to control an average molecular weight of the resulting prepolymer, specifically an intrinsic viscosity (η) thereof.

The prepolymer [A] is prepared under the conditions of a reaction temperature of usually 200° to 290° C., preferably 220° to 280° C., and a reaction time of usually 0.5 to 5 hours, preferably 1 to 3 hours. This reaction may be carried out at atmospheric pressure or under pressure, but it is preferably carried out under pressure. The reaction pressure is set at usually 20 to 60 kg/cm$^2$, preferably 25 to 50 kg/cm$^2$. By virtue of the polycondensation reaction mentioned above, a prepolymer having an intrinsic viscosity (η), as measured in a concentrated sulfuric acid at 30° C., of usually 0.05 to 0.6 dl/g, preferably 0.08 to 0.3 dl/g, can be obtained. The semiaromatic polyamide prepolymer having the above intrinsic viscosity usually has a number-average molecular weight of 700 to 2,000. The semiaromatic polyamide prepolymer produced in the aqueous medium is separated from the reaction solution. The separation between the reaction solution and the semiaromatic polyamide prepolymer can be carried out by, for example, filtration, centrifugal separation, etc., but it is effective that the reaction solution containing the produced semiaromatic polyamide prepolymer is flashed in air through a nozzle to perform solid-liquid separation.

In the first process for preparing the semiaromatic polyamide according to the invention, the semiaromatic polyamide prepolymer obtained as above is contacted with water, dried and then subjected to post polymerization.

In the present invention, the temperature of water contacted with the semiaromatic polyamide prepolymer is preferably high, that is, the temperature of the water used in the treatment (washing treatment) is usually 30° to 100° C., preferably 50° to 100° C., particularly preferably 70° to 100° C. The contact time (i.e., washing time) of the semiaromatic polyamide prepolymer with the water is usually 5 to 500 minutes, preferably 10 to 120 minutes, particularly preferably 30 to 90 minutes. When the contact of the semiaromatic polyamide prepolymer with the water is carried out in a container such as a drum, the contact is desirably conducted with stirring.

In the present invention, the amount of the water contacted with the semiaromatic polyamide prepolymer can be properly determined depending on the amount of the components (later-described MO components) to be transferred into the water from the semiaromatic polyamide prepolymer, the water temperature, the contact method, etc., but it is usually 50 to 10,000 parts by weight, preferably 200 to 1,000 parts by weight, based on 100 parts by weight of the semiaromatic polyamide prepolymer.

The semiaromatic polyamide prepolymer thus contacted with water contains a large amount of water, so that the semiaromatic polyamide prepolymer is dried prior to the subsequent step.

It is preferable that drying of the semiaromatic polyamide prepolymer is carried out under vacuum or in a stream of an inert gas (e.g., stream of nitrogen). The drying temperature is generally lower than the temperature at which the semiaromatic polyamide prepolymer is melted, and it is usually 100° to 180° C., preferably 120° to 140° C. By the drying under these conditions, the water concentration in the dry semiaromatic polyamide prepolymer is decreased to usually not more than 5,000 ppm, preferably not more than 3,000 ppm, more preferably not more than 1,000 ppm.

For the drying, infrared rays, etc. are employable as heating means.

In the present invention, the dry semiaromatic polyamide prepolymer obtained as above is then subjected to post polymerization (polycondensation reaction).

It is preferable that the post polymerization (post polycondensation reaction) is carried out by heating the dry semiaromatic polyamide prepolymer to be molten and applying a shear stress to the molten resin.

In this reaction, the dry semiaromatic polyamide prepolymer is heated to a temperature at which the prepolymer is at least melted. In general, the dry semiaromatic polyamide prepolymer is heated to a temperature not lower than the melting point of the dry semiaromatic pomade prepolymer, preferably to a temperature higher than the melting point of the prepolymer by 10° to 60° C.

The shear stress can be applied to the molten resin by means of a twin-screw extruder with vent, a kneader, a Brabender mill or the like.

It is presumed that, by virtue of application of a shear stress to the molten resin, the molten dry semiaromatic polyamide prepolymers are mutually polycondensed, and also the polycondensation reaction of the resulting condensate further proceeds.

The second process for preparing a semiaromatic polyamide having a low content of the MO components according to the invention is a process comprising the steps of preparing a high-molecular weight semiaromatic polyamide having an intrinsic viscosity ($\eta$) of not less than 0.7 dl/g and then treating the semiaromatic polyamide with water.

For preparing the high-molecular weight semiaromatic polyamide, various known processes are available. For example, the above-mentioned prepolymer is first prepared and the prepolymer is then melt kneaded to obtain the high-molecular weight semiaromatic polyamide, or the above-mentioned compounds are reacted with each other under heating to directly prepare the high-molecular weight semiaromatic polyamide.

In the semiaromatic polyamide prepared as above, unreacted dicarboxylic acids, unreacted diamine, unreacted lactam or aminocarboxylic acid, cyclic oligomer formed from one molecule of diamine and one molecule of dicarboxylic acid, particularly cyclic hexamethylene adipamide, and other low oligomers components, which are defined as MO components, are generally contained in addition to the desired semiaromatic polyamide. These components are soluble in boiling water.

The content of the MO components in conventional semiaromatic polyamides sometimes may reach as much as 2% by weight.

In contrast, the semiaromatic polyamide of the invention has a low content of the MO components, and the content of the MO components in the invention (determined by immersing a sample in boiling water at 100° C. for 24 hours and measuring the quantity of the extracts) is usually not more than 0.25% by weight, preferably not more than 0.15% by weight, particularly preferably not more than 0.10% by weight.

In order to decrease the content of the MO components to the above extent, the obtained semiaromatic polyamide is contacted with an aqueous medium to transfer the MO components contained in the semiaromatic polyamide into the aqueous medium and thereby remove them. The aqueous medium used herein is generally water, and this aqueous medium may contain water-soluble organic solvents such as alcohols, if needed.

It is preferable that the contact of the semiaromatic polyamide with aqueous medium is carried out under warming or heating. The temperature and the amount of the aqueous medium are the same as those in case of the prepolymer. The contact time (i.e., washing time) of the semiaromatic polyamide with the water is usually 5 minutes to 24 hours, preferably 5 minutes to 15 hours, more preferably 10 minutes to 8 hours, particularly preferably 30 minutes to 5 hours.

By virtue of contacting the semiaromatic polyamide containing large amounts of MO components with the aqueous medium, at least a part of the MO components are extracted from the semiaromatic polyamide into the aqueous medium.

The aqueous medium into which the MO components have been extracted is separated from the semiaromatic polyamide, whereby the content of the MO components in the semiaromatic polyamide can be decreased to the above-mentioned extent. The separation between the aqueous medium and the semiaromatic polyamide can be carried out by a known method such as filtration or centrifugal separation.

The semiaromatic polyamide thus separated from the aqueous medium is then generally dried to remove water content.

The conditions for drying the semiaromatic polyamide and the water concentration in the semiaromatic polyamide after drying are the same as those in case of the prepolymer, except that the drying temperature is set at 100° to 250° C., preferably 120° to 200° C.

Another process for preparing a semiaromatic polyamide having a low content of the MO components according to the invention is a process in which the semiaromatic polyamide is melt extruded, while an inert gas is supplied into the polyamide resin to form an inert gas flow in the extruder and thereby increase venting effect. The gas to be supplied is inert to the polyamide resin, and examples thereof include a nitrogen gas and other inert gases such as an argon gas. In order to decrease the content of the MO components to not more than 0.25% by weight, the ratio of the flow rate ($m^3$/hr) of the supplied gas to the discharge rate (kg/hr) is preferably made to be not less than 0.02. The ratio of the gas flow rate ($m^3$/hr) to the discharge rate (kg/hr) is particularly preferably not less than 0.05.

In order to decrease the content of the MO components, there can further be employed the following process which comprises the steps of:

bringing terephthalic acid and optionally isophthalic acid and an aliphatic dicarboxylic acid of 4 to 18 carbon atoms into contact with an aliphatic diamine of 4 to 12 carbon atoms and optionally a lactam or an aminocarboxylic acid of 6 to 20 carbon atoms, to prepare an aromatic polyamide prepolymer comprising 40 to 90% by mol of the recurring units (A) derived from the terephthalic acid and the aliphatic diamine of 4 to 12 carbon atoms, 0 to 50% by mol of the recurring units (B) derived from the isophthalic acid and the aliphatic diamine of 4 to 12 carbon atoms, 0 to 60% by mol of the recurring units (C) derived from the aliphatic dicarboxylic acid of 4 to 18 carbon atoms and the aliphatic diamine of 4 to 12 carbon atoms and 0 to 50% by mol of the recurring units (D) derived from the lactam or the aminocarboxylic acid of 6 to 20 carbon atoms, then subjecting the prepolymer to solid phase polymerization to prepare a semiaromatic polyamide prepolymer having an intrinsic viscosity ($\eta$) of 0.5 to 1.5 dl/g, and further subjecting the prepolymer to melt polymerization to obtain a semiaromatic polyamide having an intrinsic viscosity ($\eta$) of 0.8 to 2.5 dl/g.

If the process is combined with the aforesaid process of melt extruding the semiaromatic polyamide with supplying an inert gas into the resin, a semiaromatic polyamide having a content of the MO components of not more than 0.25% by weight can be easily prepared.

In the first step of the process to prepare a semiaromatic polyamide having a decreased content of MO components, the dicarboxylic acid and the diamine are polycondensed through melt reaction, to obtain a prepolymer having an intrinsic viscosity ($\eta$), as measured in a concentrated sulfic acid at 30° C. (the same applies hereinafter), of 0.05 to 0.6 dl/g, preferably 0.08 to 0.3 dl/g, in the form of a solid.

The reaction to prepare the prepolymer is conducted at a temperature of usually 200° to 290° C., preferably 220° to 280° C., for a period of usually 0.5 to 5 hours, preferably 1 to 3 hours. This reaction can be carried out at atmospheric pressure or under pressure, but it is preferably carried out under high pressure. In this case, the reaction pressure is in the range of usually 20 to 60 kg/cm$^2$, preferably 25 to 50 kg/cm$^2$.

Prior to the solid phase polymerization, the prepolymer obtained in the above step is preferably subjected to removal of water content therefrom and adjustment of its crystallinity. That is, it is preferable that the water content in the prepolymer is decreased to not more than 5,000 ppm and the crystallinity is made to be not less than 20%, though these conditions are not essential.

The water content and the crystallinity of the prepolymer can be adjusted to be in the above-mentioned preferable ranges by heating the prepolymer at a temperature lower than the heating temperature in the solid phase polymerization step. In general, the prepolymer is heated at a temperature of 50° to 170° C., preferably 100° to 150° C.

Subsequently, the prepolymer is heated under vacuum or in a gas stream to perform solid phase polymerization, whereby an aromatic polyamide is prepared. The solid phase polymerization can be carried out in any of continuous and batchwise processes. The apparatus used for the polymerization may be any of vertical and horizontal ones, and it may be any of stationary type, main body rotary type and stirring type.

In the present invention, the solid phase polymerization to prepare the semiaromatic polyamide is carried out by heating the prepolymer at usually 170° C. to a temperature of not higher than the melting point of the prepolymer, preferably 200° to 260° C., for a period of usually 0.03 to 6 hours, preferably 0.1 to 2 hours.

The solid phase polymerization can be conducted either under vacuum or in a gas stream, but it is preferably conducted in a gas stream, particularly in an inert gas stream. In this case, the gas is used in an amount of usually 1 to 500 liters, preferably 20 to 300 liters, based on 1 kg of the prepolymer.

Through the solid phase polymerization of the prepolymer, a semiaromatic polyamide having an intrinsic viscosity ($\eta$) of 0.5 to 1.0 dl/g, preferably 0.65 to 0.8 dl/g can be obtained.

In the semiaromatic polyamide prepared through the solid phase polymerization step, the MO components are contained in amounts smaller than those in a polyamide prepared by a melt kneading process or the like. If it is wanted to decrease the content of the MO components to not more than 0.25% by weight, particularly not more than 0.15% by weight, the above process is insufficient, so it is preferable to combine with another process.

In the present invention, it is preferable that the semiaromatic polyamide obtained above is then melted and polycondensed with applying a shear stress, whereby the desired aromatic polyamide of high polymerization degree can be obtained. In order to melt the aromatic polyamide prepolymer and to apply a shear stress thereto, a twin-screw vented extruder, a kneader, a Brabender, etc. are employable.

The semiaromatic polyamide prepared as above has the aforesaid recurring units and has a glass transition temperature of 70° to 150° C., preferably 80° to 125° C. Further, the semiaromatic polyamide of the invention is crystalline, so that it has a melting point, and the melting point is in the range of 260° to 360° C., in many cases 280° to 330° C. In case of the treatment with an aqueous medium, the semiaromatic polyamide has an intrinsic viscosity ($\eta$), as measured in a concentrated sulfuric acid at 30° C., of usually 0.5 to 3.0 dl/g, preferably 0.5 to 2.0 dl/g, more preferably 0.7 to 1.5 dl/g, particularly preferably 0.8 to 1.2 dl/g. In case of the melt extrusion in an inert gas, the semiaromatic polyamide has an intrinsic viscosity ($\eta$) of usually 0.5 to 3.0 dl/g, preferably 0.9 to 1.5 dl/g.

The semiaromatic polyamide obtained as above has a low content of the MO components. Therefore, mold contamination caused by the MO components is hardly brought about and molded articles can be produced in a stable molding operation. Moreover, even by the above treatments, the properties of the semiaromatic polyamide are not deteriorated, and the molded articles produced by the use of the thus treated semiaromatic polyamide retain good heat resistance, high mechanical strength, low water absorption properties and good abrasion resistance, which are excellent properties inherent in the semiaromatic polyamide.

In the production of molded articles using the semiaromatic polyamide of the invention, various additives used in the conventional molding processes using polyamides, e.g., stabilizers, pigments and lubricants, are employable.

The semiaromatic polyamide of the invention can be molded into articles of desired shapes by heating it to a temperature of not lower than the melting point and lower than the decomposition temperature of the semiaromatic polyamide using a conventional molding apparatus.

In the present invention, the semiaromatic polyamide prepolymer is washed with, for example, boiling water to selectively transfer the unreacted starting monomers and low oligomers (MO components) into the aqueous phase and thereby remove them. Therefore, the polycondensation reaction under shear stress is hardly inhibited by the MO components, and hence a semiaromatic polyamide resin can be obtained for a short period of time.

More specifically, in the preparation of a semiaromatic polyamide of equivalent properties, the amount per unit time of the semiaromatic polyamide prepolymer (starting material in the polycondensation) fed to the melt kneading apparatus can be increased.

Composition Containing Semiaromatic Polyamide

The semiaromatic polyamide compositions of the invention are the first to the fourth compositions mentioned above.

The first composition comprises the semiaromatic polyamide and 5 to 250 parts by weight of a fibrous reinforcement based on 100 parts by weight of the semiaromatic polyamide.

The second composition comprises 99 to 30% by weight of the semiaromatic polyamide and 1 to 70% by weight of a modified elastomeric polymer. This second composition preferably further contains the same fibrous reinforcement as mentioned above.

The third composition comprises 99 to 30% by weight of the semiaromatic polyamide and 1 to 70% by weight of an aliphatic polyamide. This third composition preferably further contains the same modified elastomeric polymer and/or the same fibrous reinforcement as mentioned above.

The fourth composition comprises the semiaromatic polyamide or a composition containing the same and a flame retardant.

Fibrous Reinforcement

Examples of the fibrous reinforcements employable in the invention include inorganic fibrous reinforcements, such as glass fiber, potassium titanate fiber, metal-coated glass fiber, ceramic fiber, wallastonite, carbon fiber, metallic carbide fiber and hardened metallic fiber; and organic fibrous reinforcements. These fibrous reinforcements may be surface treated with silane compounds, for example, vinyltriethoxysilane, 2-aminopropyltriethoxysilane and 2-glycidoxypropyltrimethoxysilane. Of the reinforcements, preferable are inorganic fibrous reinforcement from the viewpoint of heat resistance, and particularly preferable is glass fiber because it exerts best reinforcing effects.

The fibrous reinforcement is used in an amount of 5 to 250 parts by weight, preferably 10 to 220 parts by weight, more preferably 15 to 150 parts by weight, based on 100 parts by weight of the semiaromatic polyamide.

The composition comprising the semiaromatic polyamide and the fibrous reinforcement according to the invention has a heat distortion temperature HDT, as measured in accordance with ASTM D 648 (load: 18.6 kg/cm$^2$), of not lower than 250° C. and a flexural modulus, as measured in accordance with ASTM D 750, of not less than 100,000 kg/cm$^2$. Moreover, the content of the MO components in the composition is low, and hence mold contamination is hardly brought about in the molding process.

Modified Elastomeric Polymer

The modified elastomeric polymer employable in the invention is (i) a modified α-olefin elastomeric polymer or (ii) a modified aromatic vinyl/conjugated diene block copolymer.

The modified α-olefin elastomeric polymer is obtained by graft copolymerizing an α-olefin elastomeric polymer containing α-olefin units as major constituents with an unsaturated acid or its derivative in an amount of 0.01 to 10 parts by weight, preferably 0.05 to 5 parts by weight, based on 100 parts by weight of the α-olefin elastomeric polymer. This modified α-olefin elastomeric polymer has a crystallinity of not more than 20%, preferably 1 to 19%, and has a melt flow rate at 190° C. (MFR$_{190°\ C.}$) of 0.01 to 50 g/10 min, preferably 0.05 to 20 g/10 min. Further, the modified α-olefin elastomeric polymer has a molecular weight distribution (Mw/Mn) of usually 1.5 to 50, preferably 2 to 30, and a glass transition temperature of usually not higher than −10° C., preferably not higher than −20 C.

When the amounts of graft units of the unsaturated carboxylic acid or its derivative in the modified α-olefin elastomeric polymer are smaller than 0.01 part by weight, the compatibility with the semiaromatic polyamide becomes ad, resulting in lowering of impact strength of the polyamide composition. When the graft amount exceeds 10 parts by weight, the degree of crosslinking of the graft modified product increases, and the effect of improving the impact resistance of the composition is sometimes lowered. When the crystallinity of the modified α-olefin elastomeric polymer exceeds 20%, the heat resistance of the polyamide composition is sometimes lowered.

The α-olefin elastomeric polymer, that is a base material of the modified α-olefin elastomeric polymer, may be a low-crystalline elastomeric polymer containing α-olefin units as major constituents, and it may consist of units of two or more α-olefins or may contain small amounts of diene units in addition to the α-olefin units.

The amount of the α-olefin for constituting the α-olefin elastomeric polymer is usually not less than 65% by mol, preferably not less than 70% by mol, and the amount of the diene is usually 0 to 20% by mol, preferably 0 to 15% by mol.

Examples of the α-olefins employable for forming the α-olefin elastomeric polymer include ethylene, propylene, 1-butene, 1-pentene, 4-methyl-1-pentene, 1-hexene, 1-octene, 1-decene and 1-dodecene. Examples of the dienes include non-conjugated dienes, such as 1,4-hexadiene, dicyclopentadiene, 5-ethylidene-2-norbornene and 2,5-norbornadiene; and conjugated dienes, such as butadiene, isoprene and piperylene.

Examples of the α-olefin elastomeric polymers include α-olefin elastomeric copolymers, such as an ethylene/propylene copolymer, an ethylenel/1-butene copolymer, an ethylene/4-methyl-1-pentene copolymer, an ethylene/1-hexene copolymer, an ethylene/1-octene copolymer, an ethylene/1-decene copolymer, a propylene/ethylene copolymer, a propylene/1-butene copolymer, a propylene/4-methyl-1-pentene copolymer, a propylene/1-octene copolymer, a propylene/1-decene copolymer and a propylene/1-dodecene copolymer; and α-olefin/non-conjugated diene elastomeric copolymers, such as an ethylene/propylene/1,4-hexadiene copolymer, an ethylene/propylene/dicyclopentadiene copolymer, an ethylene/propylene/5-ethylidene-2-norbornene copolymer, an ethylene/propylene/2,5-norbornadiene copolymer, an ethylene/1-butene/dicyclopentadiene copolymer, an ethylene/1-butene/1,4-hexadiene copolymer and an ethylene/1-butene/5-ethylidene-2-norbornene copolymer. The α-olefin elastomeric polymer is reacted with the below-described unsaturated carboxylic acid or its derivative in the later-described manner, to obtain the modified α-olefin elastomeric polymer.

Examples of the graft monomers used for graft modifying the α-olefin polymers include unsaturated dicarboxylic acids, such as acrylic acid, methacrylic acid, α-ethylacrylic acid, maleic acid, fumaric acid, itaconic acid, citraconic acid, tetrahydrophthalic acid, methyltetrahydrophthalic acid, endocis-bicyclo [2.2.1]hept-5-ene-2,5-dicarboxylic acid (nadic acid™) and methyl-endocis-bicyclo[2.2.1]hept-5-ene-2,5-dicarboxylic acid (methylnadic acid™); and acid halides, amides, imides, acid anhydrides and esters of the unsaturated dicarboxylic acids, such as maleic chloride, maleimide, maleic anhydride, citraconic anhydride, monomethyl maleate, dimethyl maleate and glycidyl maleate. Of these, preferable are unsaturated dicarboxylic acids and anhydrides thereof, and particularly preferable are maleic acid, nadic acid and anhydrides thereof.

For graft copolymerizing the α-olefin elastomeric polymer with the unsaturated carboxylic acid or its derivative to prepare the modified α-olefin elastomeric polymer, various known methods are available. For example, the α-olefin elastomeric polymer is melted and to the molten polymer is added a graft monomer to perform graft copolymerization, or the α-olefin elastomeric polymer is dissolved in a solvent and to the resulting solution is added a graft monomer to perform graft copolymerization. In each case, it is preferable to conduct the reaction in the presence of a radical initiator so as to efficiently graft copolymerize the graft monomer. The graft reaction is carried out at a temperature of usually 60° to 350° C. The radical initiator is used in an amount of usually 0.01 to 20 parts by weight based on 100 parts by weight of the α-olefin elastomeric polymer. Examples of the radical initiators employable herein include organic peroxides, organic peresters and azo compounds.

The modified aromatic vinyl/conjugated diene copolymer or its hydrogenated product employable in the invention is a graft modified product of a block copolymer of an aromatic vinyl hydrocarbon compound and a conjugated diene compound. A graft modified product of a hydrogenated product of this block copolymer is also employable in the invention.

Examples of the aromatic vinyl/conjugated diene copolymers and hydrogenated products thereof include a styrene/butadiene block copolymer rubber, a styrene/butadiene/styrene block copolymer rubber, a styrene/isoprene block copolymer rubber, a styrene/isoprene/styrene block copolymer rubber, a hydrogenated styrene/butadiene/styrene block copolymer rubber and a hydrogenated styrene/isoprene/styrene copolymer rubber.

In the copolymers, the molar ratio (aromatic vinyl hydrocarbon/conjugated diene) of the recurring units derived from the aromatic vinyl to the recurring units derived from the conjugated diene is in the range of usually 10/90 to 70/30. The term "hydrogenated copolymer rubber" means a copolymer obtained by partly or fully hydrogenating the double bonds remaining in the copolymer rubber.

The aromatic vinyl/conjugated diene copolymer or its hydrogenated product has an intrinsic viscosity (η), as measured in decalin at 135° C., of usually 0.01 to 10 dl/g, preferably 0.08 to 7 dl/g, and has a glass transition temperature (Tg) of usually not higher than 0° C., preferably not higher than −10° C., particularly preferably not higher than −20° C. The crystallinity of the aromatic vinyl/conjugated diene copolymer or its hydrogenated product, as measured by X-ray diffractometry, is in the range of 0 to 10%, preferably 0 to 7%, particularly preferably 0 to 5%.

The modified aromatic vinyl/conjugated diene copolymer for use in the invention is prepared by graft modifying the unmodified aromatic vinyl/conjugated diene copolymer with an unsaturated acid, anhydride of an unsaturated acid or a derivative of an unsaturated acid in a manner similar to that for preparing the aforesaid modified α-olefin random elastomeric copolymer.

Examples of the unsaturated carboxylic acids, anhydrides thereof and derivatives thereof include the same compounds as used in the preparation of the aforesaid graft modified α-olefin random elastomeric copolymer. These graft modifiers can be used singly or in combination.

Of the graft modifiers, preferably used are anhydrides of unsaturated carboxylic acids, and particularly preferably used are maleic anhydride and nadic anhydride.

For the graft polymerization of the unmodified copolymer or its hydrogenated product with the graft modifier, the solution process, the melt process or the like described above in the modification of the α-olefin random elastomeric copolymer are available.

In the graft reaction, the amount of the graft modifier is determined in consideration of its reactivity, but generally it is used in an amount of 1 to 10 parts by weight based on 100 parts by weight of the unmodified aromatic vinyl/conjugated diene copolymer or its hydrogenated product. In the graft reaction, radical initiators such as organic peroxides, organic peresters and azo compounds are employable similarly to the above-mentioned graft reaction.

Through the graft reaction, there can be obtained a graft modified aromatic vinyl/conjugated diene copolymer or its hydrogenated product wherein the graft modifier is grafted in an amount of usually 0.01 to 10 parts by weight, preferably 0.05 to 5 parts by weight, based on 100 parts by weight of the unreacted aromatic vinyl/conjugated diene copolymer or its hydrogenated product.

The graft modified aromatic vinyl/conjugated diene copolymer or its hydrogenated product obtained above is a low-crystalline or non-crystalline copolymer, and preferably is substantially non-crystalline. That is, a modified copolymer having a crystallinity, as measured by X-ray diffractometry, of usually not more than 10%, preferably not more than 7%, more preferably not more than 5% is used in the invention. Particularly, a modified copolymer having a crystallinity of substantially 0% is used. Accordingly, the modified aromatic vinyl/conjugated diene copolymer or its hydrogenated product often exhibits no definite melting point. Further, because of low crystallinity, the graft modified aromatic vinyl/conjugated diene copolymer or its hydrogenated product is non-rigid and has a tensile modulus of usually not less than 0.1 kg/cm$^2$ and less than 20,000 kg/cm$^2$, preferably 1 to 15,000 kg/cm$^2$.

The melt index (measured at 190° C.) of the graft modified aromatic vinyl/conjugated diene copolymer or its hydrogenated product is usually in the range of 0.1 to 30 g/10 min, preferably 1.0 to 20 g/10 min, particularly preferably 2.0 to 15 g/10 min.

The glass transition temperature (Tg) of the graft modified aromatic vinyl/conjugated diene copolymer or its hydrogenated product is usually in the range of −150° to +50° C., preferably −80° to −20° C.; and the intrinsic viscosity (η) thereof, as measured in decalin at 135° C., is in the range of usually 0.01 to 10 dl/g, preferably 1 to 5 dl/g.

By the use of the graft modified aromatic vinyl/conjugated diene copolymer or its hydrogenated product, molded articles of high toughness can be obtained.

In the polyamide composition of the invention, the amount of the modified α-olefin polymer or the modified aromatic vinyl/conjugated diene copolymer is in the range of preferably 0.5 to 50 parts by weight, more preferably 1.0 to 40 parts by weight, based on 100 parts by weight of the polyamide. When the amount of the modified α-olefin elastomeric polymer is less than 0.5 part by weight, the impact strength of the polyamide composition becomes poor. When the amount thereof exceeds 50 parts by weight, the tensile strength, flexural strength, elastic modulus and heat resistance of the polyamide composition are sometimes lowered.

Ionomer Resin

The ionomer resin for use in the invention is a resin obtained by partly neutralizing an ethylene/unsaturated carboxylic acid copolymer with a divalent metal ion or a monovalent metal ion.

The ethylene/unsaturated carboxylic acid copolymer for constituting the ionomer resin is a copolymer of ethylene and an unsaturated carboxylic acid. Examples of the unsaturated carboxylic acids employable herein include unsaturated carboxylic acids of 3 to 8 carbon atoms, specifically acrylic acid, methacrylic acid, itaconic acid, maleic anhydride, maleic acid monomethyl ester and maleic acid monoethyl ester. Of the unsaturated carboxylic acids, particularly preferably used are acrylic acid and methacrylic acid.

The ethylene/unsaturated carboxylic acid copolymer used in the invention may further contain the third component in addition to ethylene and the unsaturated carboxylic acid. The third component is, for example, a polar vinyl compound of about 3 to 12 carbon atoms. Examples of the polar vinyl compounds include unsaturated carboxylic acid esters, such as ethyl acrylate, isobutyl acrylate, n-butyl acrylate and methyl acrylate; and vinyl esters, such as vinyl acetate.

In the ethylene/unsaturated carboxylic acid copolymer used in the invention, ethylene is present in an amount of usually 50 to 99% by weight, preferably 70 to 98% by weight, and the unsaturated carboxylic acid is present in an amount of usually 1 to 50% by weight, preferably 2 to 30% by weight.

In the event that the ethylene/unsaturated acid copolymer further contains the third component in addition to ethylene and the unsaturated carboxylic acid, the third component is present in an amount of usually not more than 40% by weight, preferably not more than 30% by weight.

In the ionomer resin for use in the invention, at least a part of the carboxyl groups in the ethylene/unsaturated carboxylic acid copolymer are neutralized with a divalent metal ion or a monovalent metal ion, preferably a divalent metal ion.

Examples of the metal ions preferably used for the ionomer resin include alkali metal ions, such as $Na^+$, $Li^+$ and $K^+$; divalent transition metal ions, such as $Zn^{++}$, $Co^{++}$, $Ni^{++}$, $Pb^{++}$ and $Cu^{++}$; and alkaline earth metal ions, such as $Ca^{++}$ and $Mg^{++}$. Of these, $Zn^{++}$ is particularly preferably used.

It is desired that the degree of neutralization of the carboxyl groups of the ethylene/unsaturated carboxylic acid copolymer with the divalent metal ion, preferably divalent transition metal ion, is 3 to 95%.

The metal used for forming the ionomer resin is not limited to one kind, and the ionomer resin for use in the invention may have two or more kinds of metal ions.

The ionomer resin is used in an amount equal to that in case of using the modified elastomeric polymer. Further, the ionomer resin can be used in combination with the modified elastomeric polymer.

The composition comprising the semiaromatic polyamide and the modified elastomeric polymer and/or the ionomer resin not only has excellent impact resistance, particularly low-temperature impact resistance, but also has a low content of the MO components. Therefore. the composition hardly brings about mold contamination and is suitable for connectors, etc.

Aliphatic Polyamide

Examples of the aliphatic polyamides usable in the invention include polyamides formed by polycondensation of aliphatic dicarboxylic acids and aliphatic diamines, polyamides formed by ring opening polymerization of lactams, and polyamides formed from aliphatic aminocarboxylic acids, aliphatic diamines and lactams.

These aliphatic polyamides generally have a structure represented by the following formula [V].

$$-(NH-(CH_2)_n-CO)_m- \qquad [V]$$

Particular examples of the aliphatic polyamides include:

polyamides prepared from aliphatic diamines and aliphatic dicarboxylic acids, such as polytetramethylene adipamide, polyhexamethylene adipamide, polyhexamethylene suberamide, polyhexamethylene sebacamide, polyhexamethylene undecamide and polyhexamethylene dodecamide; and polyamides prepared from lactams or aminocarboxylic acids, such as polycaprolactam, polyundecamide and polydodecamide.

Of the aliphatic polyamides, polycaprolactam, polyhexamethylene adipamide, polyhexamethylene suberamide, polyundecamide, polydodecamide, polyhexamethylene undecamide and polyhexamethylene dodecamide are preferably used because molding flowability of the resulting composition can be improved when any of them is used. Of these, polyundecamide, polydodecamide, polyhexamethylene undecamide and polyhexamethylene dodecamide are particularly preferably used because thermal aging resistance of the resulting composition can be improved.

The aliphatic polyamide (C) has an intrinsic viscosity ($\eta$) (measured in a concentrated sulfuric acid at 30° C.) of usually 0.5 to 3.0 dl/g, preferably 0.7 to 1.5 dl/g.

It is desirable that the aliphatic polyamide (C) is contained in the resin components of the polyamide resin composition of the invention in an amount of 1 to 70% by weight, preferably 1 to 30% by weight, more preferably 3 to 20% by weight. When the content of the aliphatic polyamide (C) is in the above range, there can be obtained a composition having improved toughness and capable of producing molded articles showing a good balance of various properties such as heat resistance and water absorption properties. Moreover, the moldability of the composition can be improved.

Flame Retardant

Examples of the flame retardants for use in the invention includes an organic flame retardant and an inorganic auxiliary flame retardant.

As the organic flame retardant, (i) halogenated polystyrene and/or (ii) a condensate of halogenated phenol is particularly preferably employed. The halogenated polystyrene and the condensate of halogenated phenol are described below.

The halogenated polystyrene employable in the invention is represented by the following formula (1):

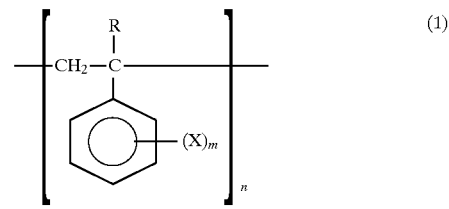

wherein R is H or $CH_3$, X is Br or Cl, m is an integer of 1 to 5, and n is an integer of 2 or more.

Examples of the halogenated polystyrenes represented by the formula (1) include polydibromostyrene, polytribromostyrene, polypentabromostyrene, polydichlorostyrene, polytrichlorostyrene, polypentachlorostyrene and polytribromo-α-methylstyrene. Of the halogenated polystyrenes, polytribromostyrene is preferable because flame retardance, heat resistance and thermal aging resistance of the resulting composition can be improved. Polydibromostyrene is also preferable because of good moldability.

The halogenated polystyrene is prepared by polymerizing halogenated styrene or halogenated α-methylstyrene, or halogenating polystyrene or poly-α-methylstyrene.

The condensate of halogenated phenol employable in the invention is represented by the following formula (2):

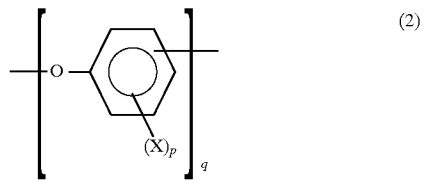

(2)

wherein X is Br or Cl, p is an integer of 1 to 4, and q is an integer of 5 or more.

Examples of the condensates of halogenated phenols represented by the formula (2) include polydibromo-p-phenylene oxide, polytribromo-p-phenylene oxide, polydichloro-p-phenylene oxide, polybromo-p-phenylene oxide and polydibromo-o-phenylene oxide. Of the condensates of halogenated phenols, polydibromo-p-phenylene oxide is preferable because heat resistance and flame retardance of the resulting composition can be improved.

Of the above flame retardants, i.e., the halogenated polystyrenes and the condensates of halogenated phenols, polytribromostyrene is most preferable because the resulting composition shows excellent heat stability in the molding process and exerts high effect of flame retardance.

The inorganic auxiliary flame retardant used for the semiaromatic polyamide composition of the invention is preferably a metallic compound. Examples of the metallic compounds include metallic oxides, such as antimony oxide, zinc oxide, iron oxide and magnesium oxide; and metallic salts of boric acid, such as zinc borate. It is particularly preferable that the composition contains sodium antimonate. The sodium antimonate has chemical composition represented by the formula $NaSbO_3$, and is preferably used in the form of fine particles having a particle diameter of not more than 30 μm, particularly not more than 10 μm.

It is also preferable that the semiaromatic polyamide composition of the invention further contains magnesium oxide, zinc oxide, hydrotalcite or a phosphorus compound as a heat stabilizer. These oxides are preferably as small as possible, and they desirably have a particle diameter of not more than 30 μm, particularly not more than 10 μm.

The organic flame retardant is desirably contained in an amount of 20 to 100 parts by weight, preferably 30 to 80 parts by weight, more preferably 40 to 65 parts by weight, based on 100 parts by weight of the semiaromatic polyamide.

The inorganic auxiliary flame reardant is desirably contained in an amount of 2 to 20 parts by weight, preferably 4 to 16 parts by weight, more preferably 6 to 14 parts by weight, based on 100 parts by weight of the semiaromatic polyamide.

In the present invention, it is preferable to use the organic flame retardant and the inorganic auxiliary flame retardant in combination. The composition comprising the semiaromatic polyamide and the flame retardant has excellent flame retardance and hardly brings about mold contamination in the molding process. Therefore, the composition is suitably applied to uses, for example, for substrates requiring reflow solderability.

Ratio of Components

The first composition of the invention comprises the semiaromatic polyamide and 5 to 250 parts by weight, preferably 10 to 220 parts by weight, more preferably 15 to 150 parts by weight of the fibrous reinforcement based on 100 parts by weight of the semiaromatic polyamide.

The second composition of the invention comprises the semiaromatic polyamide in an amount of 30 to 99% by weight, preferably 70 to 95% by weight, and the modified elastomeric polymer in an amount of 1 to 70% by weight, preferably 5 to 30% by weight, and optionally contains the fibrous reinforcement in an amount of 5 to 250 parts by weight, preferably 10 to 220 parts by weight, based on 100 parts by weight of the total amount of the semiaromatic polyamide and the modified elastomeric polymer.

The third composition of the invention comprises the semiaromatic polyamide in an amount of 30 to 99% by weight, preferably 80 to 97% by weight, and the aliphatic polyamide in an amount of 1 to 70% by weight, preferably 3 to 20% by weight, and optionally contains the fibrous reinforcement in an amount of 5 to 250 parts by weight, preferably 10 to 220 parts by weight, or the modified elastomeric polymer in an amount of 10 to 60 parts by weight, preferably 20 to 40 parts by weight, based on 100 parts by weight of the total amount of the semiaromatic polyamide and the aliphatic polyamide.

The fourth composition of the invention comprises the semiaromatic polyamide and the flame retardant, and the flame retardant is desirably contained in an amount of 20 to 120 parts by weight, preferably 30 to 100 parts by weight, more preferably 40 to 80 parts by weight, based on 100 parts by weight of the semiaromatic polyamide. The first to the third compositions may further contain the flame retardant, and the amount of the flame retardant is the same as above.

Other Components

In the polyamide compositions of the invention, various known additives, e.g., heat stabilizers, weathering stabilizers, plasticizers, thickening agents, antistatic agents, release agents, pigments, dyes, inorganic or organic fillers, nucleating agents and other inorganic compounds, such as carbon black, talc, clay and mica, may be contained within limits not prejudicial to the objects of the invention, in addition to the above-described components.

Further, other various polymers, e.g., polyolefins, such as polyethylene, polypropylene and poly-4-methyl-1-pentene, olefin copolymers, such as an ethylene/propylene copolymer, an ethylene/1-butene copolymer, a propylene/ethylene copolymer and a propylene/1-butene copolymer, polystyrene, polyamide, polycarbonate, polyacetal, polyphenylene oxide, fluororesins, silicone resins and aliphatic polyamides may be contained.

The semiaromatic polyamide compositions of the invention can be prepared by various known processes. For example, the components are mixed by a Henschel mixer, a V-type blender, a ribbon blender, a tumbling blender or the like. Or, the components are mixed and then melt kneaded by a single-screw extruder, a multi-screw extruder, a kneader, a Banbury mixer or the like, followed by granulation or pulverization.

Since the semiaromatic polyamide contained in the semiaromatic polyamide compositions of the invention has a low content of the MO components, mold contamination caused by the MO components is hardly brought about and a vent of a mold is hardly clogged. Therefore, molded articles can be produced in a stable molding operation. Moreover, the properties of the semiaromatic polyamide are not lowered even by decreasing the content of the MO components, and therefore the molded articles formed from the semiaromatic polyamide compositions of the invention not only retain heat resistance, mechanical strength, low water absorption and abrasion resistance, which are excellent properties inherent in the semiaromatic polyamide, but also have excellent impact resistance and flexural strength. Especially when a flame retardant is introduced into the semiaromatic polyamide compositions, the molded articles obtained therefrom are excellent in flame retardance as well as in the above properties.

The semiaromatic polyamide compositions of the invention can be molded into articles of desired shapes by heating them at a temperature of not lower than the melting point of the semiaromatic polyamide and lower than the decomposition temperature thereof using conventional molding apparatuses.

EFFECT OF THE INVENTION

In the present invention, the amounts of the MO components contained in the semiaromatic polyamide are decreased by contacting the semiaromatic polyamide with an aqueous medium or melt extruding the semiaromatic polyamide with injecting an inert gas into the polyamide resin. By the use of the semiaromatic polyamide of the invention, therefore, mold contamination is hardly brought about, and molded articles for precision electrical parts requiring heat resistance can be produced with long-term stability and accuracy.

EXAMPLE

The present invention will be further described with reference to the following examples, but it should be construed that the invention is in no way limited to those examples.

Example A-1

A reactor was charged with 99.8 kg (859 mol) of 1,6-diaminohexane, 63.8 kg (384 mol) of terephthalic acid, 68.6 kg (470 mol) of adipic acid, 204 g (1.92 mol) of sodium hypophosphite as a catalyst, 1.3 kg (10.6 mol) of benzoic acid as a terminating reagent and 24 liters of water. After the reactor was purged with nitrogen, the reaction was carried out for 1 hour under the conditions of a temperature of 250° C. and a pressure of 25 kg/cm$^2$.

After a lapse of 1 hour, the reaction product produced in the reactor was flashed in air through a nozzle to perform solid-liquid separation and cooling at the same time, followed by drying. Thus, 215 kg of a dry semiaromatic polyamide prepolymer was obtained.

The polyamide prepolymer was continuously fed to a twin-screw extruder of 57 mm diameter preset at a cylinder temperature of 340° C. at a feed rate of 55 kg/hr, to perform melt polycondensation. Thus, pellets of a sermiaromatic polyamide consisting of 45% by mol of recurring units ("6T") derived from the 1,6-diaminohexane and the terephthalic acid and 55% by mol of recurring units ("66") derived from the 1,6-diaminohexane and the adipic acid were prepared.

The semiaromatic polyamide had an intrinsic viscosity ($\eta$), as measured in a concentrated sulfuric acid at 30° C., of 1.0 dl/g, a glass transition temperature (Tg) of 75° C. and a melting point (Tm) of 295° C. The content of MO components in the semiaromatic polyamide, as measured in the following manner, was 0.46% by weight. The intrinsic viscosity; tensile strength, tensile elongation, flexural strength, flexural modulus, Izod impact strength (notched), heat distortion temperature (HDT), SFL and the content of MO components of the untreated semiaromatic polyamide are set forth in Table 1.

The content of the MO components was measured in the following manner.

Measurement of Content of MO Component

Into a 300 ml conical flask, 20 to 30 g of polyamide pellets having been vacuum dried at 110° C. for 24 hours to remove water content and 200 ml of distilled water were introduced, and they were stirred at 100° C. for 24 hours to perform extraction.

The extract was cooled and then filtered. The filtrate was transferred into an eggplant type flask. On the other hand, over the pellets separated by the filtration were poured 50 cc of water and then 50 cc of isopropanol, to wash the pellets and the flask.

The resulting filtrate was then transferred into the above-mentioned eggplant type flask and distilled to dryness under reduced pressure with removing the solvent, to obtain MO components. The MO components were weighed with tare by means of an accurate balance.

The content (% by weight) of the MO components was calculated by the following equation.

$$B/A \times 100 = X$$

B: weight of MO components
A: weight of polyamide pellets before test
X: content (%) of MO components
The SFL was measured in the following manner

Evaluation of SFL

A mold for injection molding was provided with a semi-circular spiral groove. A molten resin was subjected to injection molding into a mold at a cylinder temperature of 320° C. and a mold temperature of 70° C. In this injection molding, the length by which the molten resin flows into the groove is taken as SFL.

The semiaromatic polyamide pellets and 300 parts by weight of boiling water (100° C.) based on 100 parts by weight of the semiaromatic polyamide pellets were introduced into a drum, and they were stirred for 24 hours to contact them.

Then, the semiaromatic polyamide pellets were separated from the water and dried. The content of the MO components in the thus treated semiaromatic polyamide pellets was 0.05% by weight.

Other properties of the semiaromatic polyamide pellets were measured, and the results are also set forth in Table 1.

Evaluation of Mold Contamination

A mold for injection molding was provided with a spiral gas vent having an outer periphery of 0.3×3 mm. In this mold, a resin was subjected to 100-shot injection molding in accordance with the standard injection conditions for various resins. Then, the clogging of the gas vent of the spiral mold (mold contamination) was visually evaluated.

TABLE 1

|  | Untreated semiaromatic polyamide | Semiaromatic polyamide treated with boiling water |
|---|---|---|
| Composition (molar ratio) | 6T/66 = 45/55 | 6T/66 = 45/55 |
| Intrinsic viscosity ($\eta$) (dl/g) | 1.00 | 1.01 |
| Tm (°C.) (by DSC method) | 295 | — |
| Tg (°C.) (by DSC method) | 75 | — |
| Tensile strength (kg/cm$^2$) | 850 | 880 |
| Tensile elongation (%) | 5 | 5 |
| Flexural strength (kg/cm$^2$) | 1,250 | 1,240 |
| Flexural modulus (kg/cm$^2$) | 28,600 | 28,200 |
| Izod impact strength (notched) (kg · cm/cm) | 8.0 | 8.5 |
| HDT (°C.) | 98 | 97 |
| SFL | 44 | 40 |
| Content of MO component (% by weight) | 0.46 | 0.05 |
| Mold contamination | observed | not observed |

Remarks:

The intrinsic viscosity ($\eta$) is measured in a concentrated sulfuric acid at 30° C. and expressed in dl/g.

The content of the MO components is expressed in % by weight.

Example A-2

The MO components were removed in the same manner as in Example A-1, except that pellets of a semiaromatic polyamide consisting of 55% by mol of recurring units ("6T") derived from the 1,6-diaminohexane and the terephthalic acid and 45% by mol of recurring units ("66") derived from the 1,6-diaminohexane and the adipic acid were prepared and used.

The properties of the semiaromatic polyamide before and after the treatment are set forth in Table 2.

TABLE 2

|  | Untreated semiaromatic polyamide | Semiaromatic polyamide treated with boiling water |
|---|---|---|
| Composition (molar ratio) | 6T/66 = 55/45 | 6T/66 = 55/45 |
| Intrinsic viscosity ($\eta$) (dl/g) | 1.00 | 1.01 |
| Tm (°C.) (by DSC method) | 310 | — |
| Tg (°C.) (by DSC method) | 80 | — |
| Tensile strength (kg/cm$^2$) | 950 | 1,050 |
| Tensile elongation (%) | 5 | 5 |
| Flexural strength (kg/cm$^2$) | 1,500 | 1,480 |
| Flexural modulus (kg/cm$^2$) | 32,300 | 32,000 |
| Izod impact strength (notched) (kg · cm/cm) | 7.2 | 7.5 |
| HDT (°C.) | 110 | 110 |
| SFL | 47 | 44 |
| Content of MO component (% by weight) | 0.30 | 0.04 |
| Mold contamination | observed | not observed |

Example A-3

The MO components were removed in the same manner as in Example A-1, except that pellets of a semiaromatic polyamide consisting of 45% by mol of recurring units ("6T") derived from the 1,6-diaminohexane and the terephthalic acid and 55% by mol of recurring units ("66") derived from the 1,6-diaminohexane and the adipic acid and having a low intrinsic viscosity ($\eta$) were prepared in the extruder by varying the residence time and they were used.

The properties of the semiaromatic polyamide before and after the treatment are set forth in Table 3.

TABLE 3

|  | Untreated semiaromatic polyamide | Semiaromatic polyamide treated with boiling water |
|---|---|---|
| Composition (molar ratio) | 6T/66 = 45/55 | 6T/66 = 45/55 |
| Intrinsic viscosity ($\eta$) (dl/g) | 0.85 | 0.87 |
| Tm (°C.) (by DSC method) | 295 | — |
| Tg (°C.) (by DSC method) | 75 | — |
| Tensile strength (kg/cm$^2$) | 700 | 770 |
| Tensile elongation (%) | 3 | 4 |
| Flexural strength (kg/cm$^2$) | 1,100 | 1,150 |
| Flexural modulus (kg/cm$^2$) | 26,000 | 26,000 |
| Izod impact strength (notched) (kg · cm/cm) | 5.0 | 7.0 |
| HDT (°C.) | 94 | 94 |
| SFL | 90 | 80 |
| Content of MO component (% by weight) | 0.50 | 0.05 |
| Mold contamination | observed | not observed |

Examples A-4 to A-7

Semiaromatic polyamides were prepared in the same manner as in Example A-1, except that the semiaromatic polyamides having compositions shown in Table 4 were used and they were each contacted with boiling water for a period of time shown in Table 4 to remove MO components.

The contents of the MO components in each of the semiaromatic polyamides before and after the treatment and occurrence of mold contamination are set forth in Table 4.

TABLE 4

| | Kind and amount (mol %) of dicarboxylic acid component | | | | Kind and amount (mol %) of diamine component | |
|---|---|---|---|---|---|---|
| | Tele-phthalic acid | Iso-phthalic acid | Adipic acid | Other di-carboxylic acid | Hexa-methylene diamine | Other diamine component |
| A-4 | 50 | — | 50 | — | 100 | — |
| A-5 | 65 | — | 35 | — | — | 100*4 |
| A-6 | 70 | 20 | — | 10*1 | 100 | — |
| A-7 | 65 | 15 | 20 | — | 100 | — |

| | Kind and amount (mol %) of caprolactam | | Content of MO components (wt %) | | Mold contamination |
|---|---|---|---|---|---|
| | $\epsilon$-amino-caprolactam | Other caprolactam | Before treatment | After treatment | after treatment |
| A-4 | — | — | 0.35 | 0.05 | not observed |
| A-5 | — | — | 0.30 | 0.05 | not observed |
| A-6 | — | — | 0.28 | 0.05 | not observed |
| A-7 | — | — | 0.28 | 0.05 | not observed |

Remarks:
  Other dicarboxylic acid component of *1: sebacic acid
  Other diamine component of *2: meta-xylenediamine
  Other diamine component of *3: 1,4-diaminobutane
  Other diamine component of *4: 2-methyl-1,5-diaminopentane As shown in Table 4, the semiaromatic polyamides of the invention have low contents of the MO components. Therefore, mold contamination is hardly brought about and molded articles can be efficiently produced.

Example B-1

An aromatic polyamide precursor (polyamide prepolymer) was prepared by the following process.

Preparation of Aromatic Polyamide Prepolymer

A reactor was charged with 99.8 kg (859 mol) of 1,6-diaminohexane, 68.5 kg (412 mol) of terephthalic acid, 64.5 kg (441 mol) of adipic acid, 204 g (1.92 mol) of sodium hypophosphite as a catalyst, 1.3 kg (10.6 mol) of benzoic acid as a terminating reagent and 24 liters of water. After the reactor was purged with nitrogen, the reaction was carried out for 1 hour under the conditions of a temperature of 250° C. and a pressure of 35 kg/cm$^2$. The molar ratio between the terephthalic acid and the adipic acid was 48.3: 51.7.

After 1 hour, the reaction product produced in the reactor was flashed in air through a nozzle to perform solid-liquid separation and cooling at the same time, followed by drying. Thus, 215 kg of a dry semiaromatic polyamide prepolymer was obtained. This unwashed semiaromatic polyamide prepolymer had an intrinsic viscosity ($\eta$), as measured in a concentrated sulfuric acid at 30° C., of 0.17 dl/g. The total content of the MO components in the unwashed semiaromatic polyamide prepolymer was 5,800 ppm.

Washing and Drying of Polyamide Prepolymer

100 Kilograms of the semiaromatic polyamide prepolymer was weighed out. Then, this semiaromatic polyamide prepolymer of 100 kg and water of 300 liters at 80° C. were introduced into a drum equipped with a stirring device to wash the prepolymer for 1 hour.

After the washing, the semiaromatic polyamide prepolymer was dehydrated by means of a centrifugal separator to decrease the water content to not more than 10% by weight and then dried at 110° C. for 48 hours by means of a tray type vacuum dryer.

The total content of the MO components in the obtained dry semiaromatic polyamide prepolymer, the water content therein and the intrinsic viscosity ($\eta$) thereof as measured in a concentrated sulfuric acid at 30° C. are as follows.

Dry Semiaromatic Polyamide Prepolymer

Total content of MO components: 0.39% by weight

Water content: 1,230 ppm

Intrinsic viscosity ($\eta$): 0.17 dl/g

The polyamide prepolymer was washed, dried, then continuously fed to a twin-screw extruder of 57 mm diameter preset at a cylinder temperature of 340° C. at a feed rate of 55 kg/hr and subjected to melt polycondensation, to obtain a semiaromatic polyamide.

The properties of the semiaromatic polyamide are set forth in Table 5.

Comparative Example B-1

A semiaromatic polyamide was obtained in the same manner as in Example B-1, except that the polyamide prepolymer was not washed and the feed rate of the prepolymer was varied to 45 kg/hr.

The properties of the semiaromatic polyamide are set forth in Table 5.

Example B-2

The polyamide prepolymer obtained above was washed, dried, then continuously fed to a twin-screw extruder of 57 mm diameter preset at a cylinder temperature of 340° C. at a feed rate of 70 kg/hr and subjected to melt polycondensation, to obtain a semiaromatic polyamide.

The properties of the semiaromatic polyamide are set forth in Table 5.

Comparative Example B-2

A semiaromatic polyamide was obtained in the same manner as in Example B-2, except that the polyamide prepolymer was not washed.

The properties of the semiaromatic polyamide are set forth in Table 5.

TABLE 5

| Property Items | Ex. B-1 | Comp. Ex. B-1 | Ex. B-2 | Comp. Ex. B-2 |
|---|---|---|---|---|
| Feed rate (kg/hr) | 55 | 45 | 70 | 70 |
| Intrinsic viscosity (dl/g) | 1.08 | 1.08 | 0.90 | 0.72 |
| Melting point (°C.) | 300 | 300 | 300 | 300 |
| Tg (°C.) | 80 | 80 | 80 | 80 |
| Content of MO components (wt %) | 0.24 | 0.40 | 0.24 | 0.40 |

Remarks:

The feed rate is a weight per hour of the prepolymer fed to the extruder and is expressed in kg/hr.

The intrinsic viscosity ($\eta$) is measured in a concentrated sulfuric acid at 30° C. and expressed in dl/g.

The content of the MO components is expressed in % by weight.

Example B-3

In accordance with the process of Example A-1, pellets of a semiaromatic polyamide consisting of 55% by mol of recurring units derived from 1,6-diaminohexane and terephthalic acid and 45% by mol of recurring units derived from 1,6-diaminohexane and adipic acid were prepared.

Measurement of the content of the MO components in the semiaromatic polyamide resulted in 0.29% by weight.

The semiaromatic polyamide pellets were melt extruded by an extruder (TEX-44, manufactured by Nippon Seikosho) at rotational speed of 250 rpm. In this melt extrusion, the flow rate of nitrogen was 5 m$^3$/hr, the discharge rate was 40 kg/hr, and the ratio of the flow rate of nitrogen to the discharge rate was 0.125. The nitrogen gas was released from the vent hole of the second barrel from the die.

The content of the MO components in the thus treated semiaromatic polyamide pellets was 0.23% by weight.

Example B-4

The same semiaromatic polyamide pellets as those prepared in Example B-3 were melt extruded by an extruder (TEX-44, manufactured by Nippon Seikosho) at a rotational speed of 250 rpm. In this melt extrusion, the flow rate of nitrogen was 2.5 m$^3$/hr, the discharge rate was 40 kg/hr, and the ratio of the flow rate of nitrogen to the discharge rate was 0.063. The nitrogen gas was released from the vent hole of the second barrel from the die.

The content of the MO components in the thus treated semiaromatic polyamide pellets was 0.24% by weight.

Comparative Example B-3

The same semiaromatic polyamide pellets as those prepared in Example B-3 were melt extruded by an extruder (TEX-44, manufactured by Nippon Seikosho) at a rotational speed of 250 rpm. In this melt extrusion, the discharge rate was 40 kg/hr, but supply of nitrogen was not carried out. The vent hole of the second barrel from the die was open.

The content of the MO components in the thus treated semiaromatic polyamide pellets was 0.30% by weight.

Comparative Example B-4

The same semiaromatic polyamide pellets as those prepared in Example B-3 were melt extruded by an extruder (TEX-44, manufactured by Nippon Seikosho) at a rotational speed of 250 rpm. In this melt extrusion, supply of nitrogen was not carried out. Instead, vacuum venting was effected through the vent hole of the second barrel from the die at a degree of vacuum of 50 mmHg. The discharge rate was 40 kg/hr.

The content of the MO components in the thus treated semiaromatic polyamide pellets was 0.27% by weight.

In comparison of Examples B-3 and B-4 with Comparative Examples B-3 and B-4, it has been confirmed that the amount of the MO components contained in the semiaromatic polyamide can be decreased by melt extruding the semiaromatic polyamide with supplying nitrogen.

In comparison of Examples B-3 and B-4 with Comparative Example B-4, it has further been confirmed that, unlike the invention, the content of the MO components cannot be decreased even by effecting vacuum venting so as to increase venting efficiency in place of the supply of nitrogen.

Reference Example C-1

In accordance with the process of Example A-1, 99.8 kg (859 mol) of 1,6-diaminohexane was polycondensed with 78.1 kg (470 mol) of terephthalic acid and simultaneously with 56.0 kg (384 mol) of adipic acid, to prepare pellets of a semiaromatic polyamide consisting of 55% by mol of recurring units derived from the 1,6-diaminohexane and the terephthalic acid and 45% by mol of recurring units derived from the 1,6-diaminohexane and the adipic acid.

Measurement of the content of the MO components in the semiaromatic polyamide resulted in 0.50% by weight.

Reference Example C-2

The semiaromatic polyamide pellets of Reference Example C-1 and 300 parts by weight of boiling water (100° C.) based on 100 parts by weight of the semiaromatic polyamide pellets were introduced into a drum, and they were stirred for 24 hours to contact them. Then, the semiaromatic polyamide pellets were separated from water and dried. The content of the MO components in the thus treated semiaromatic polyamide pellets was 0.04% by weight.

Reference Example C-3

In accordance with the process of Example A-1, 99.8 kg (859 mol) of 1,6-diaminohexane was polycondensed with 63.8 kg (384 mol) of terephthalic acid and simultaneously with 68.6 kg (470 mol) of adipic acid, to prepare pellets of a semiaromatic polyamide consisting of 45% by mol of recurring units derived from the 1,6-diaminohexane and the terephthalic acid and 55% by mol of recurring units derived from the 1,6-diaminohexane and the adipic acid.

The content of the MO components in the semiaromatic polyamide pellets was 0.46% by weight.

Reference Example C-4

The semiaromatic polyamide pellets of Reference Example C-3 and 300 parts by weight of boiling water (100° C.) based on 100 parts by weight of the semiaromatic polyamide pellets were introduced into a drum, and they were stirred for 24 hours to contact them with maintaining the temperature at 100° C.

Then, the semiaromatic polyamide pellets were separated from water and dried. The content of the MO components in the thus treated semiaromatic polyamide pellets was 0.05% by weight.

Examples C-1 to C-3

The components shown in Table 6 in the amounts (parts by weight) shown in the same table were mixed. The resulting mixture was fed to a twin-screw vented extruder of 65 mm diameter preset at a temperature of 320° C., melt kneaded and pelletized.

The resulting pellets were molded by means of a 2 oz in-line screw type injection molding machine preset at a temperature of 320° C., to evaluate mold contamination.

The results are set forth in Table 6.

Evaluation of Mold Contamination

The pellets were subjected to injection molding in a spiral mold shown in FIG. 1 in accordance with the standard injection conditions for various resins, and the number of times of injection molding with which the gas vent was clogged was measured.

Comparative Examples C-1 to C-3

The mold contamination was evaluated in the same manner as in the above examples, except that the compositions shown in Table 6 were used.

The results are set forth in Table 6.

TABLE 6

|  | Ex. C-1 | Comp. Ex. C-1 | Ex. C-2 | Comp. Ex. C-2 | Ex. C-3 | Comp. Ex. C-3 |
| --- | --- | --- | --- | --- | --- | --- |
| Preparation examples of polyamide | Ref. Ex. C-2 | Ref. Ex. C-1 | Ref. Ex. C-2 | Ref. Ex. C-1 | Ref. Ex. C-4 | Ref. Ex. C-3 |
| Polyamide |  |  |  |  |  |  |
| Dicarboxylic acid component units | TA, AA | TA, AA | TA, AA | TA, AA | TA, AA | TA, AA |

TABLE 6-continued

|  | Ex. C-1 | Comp. Ex. C-1 | Ex. C-2 | Comp. Ex. C-2 | Ex. C-3 | Comp. Ex. C-3 |
|---|---|---|---|---|---|---|
| TA components units (mol %) in di- carboxylic acid component units | 55 | 55 | 55 | 55 | 45 | 45 |
| Diamine component units | HMDA | HMDA | HMDA | HMDA | HMDA | HMDA |
| Fibrous reinforcement |  |  |  |  |  |  |
| Kind | Glass fiber | Glass fiber | Glass fiber | Glass fiber | Glass fiber fiber | Glass |
| Mixing ratio (parts by weight/ 100 parts by weight) | 67 | 67 | 18 | 18 | 67 | 67 |
| Evaluation of mold contamination (number of times of continuous molding) | 10300 | 5100 | 10000 | 3600 | 9800 | 3300 |

Reference Example D-1

In accordance with the process of Example A-1, 99.8 kg (859 mol) of 1,6-diaminohexane was polycondensed with 63.8 kg (384 mol) of terephthalic acid and simultaneously with 68.6 kg (470 mol) of adipic acid, to prepare pellets of a semiaromatic polyamide consisting of 45% by mol of recurring units derived from the 1,6-diaminohexane and the terephthalic acid and 55% by mol of recurring units derived from the 1,6-diaminohexane and the adipic acid.

The content of the MO components in the semiaromatic polyamide pellets was 0.45% by weight.

Reference Example D-2

The semiaromatic polyamide pellets of Reference Example D-1 and 300 parts by weight of boiling water (100° C.) based on 100 parts by weight of the semiaromatic polyamide pellets were introduced into a drum, and they were stirred for 24 hours to contact them with maintaining the temperature at 100° C.

Then, the semiaromatic polyamide pellets were separated from water and dried. The content of the MO components in the thus treated semiaromatic polyamide pellets was 0.05% by weight.

Comparative Example D-1

In a tumbler, 95 parts by weight of the semiaromatic polyamide of Reference Example D-1 and 5 parts by weight of polyethylene modified with maleic acid were mixed. The resulting mixture was extruded by a usual twin-screw extruder (PCM-45, manufactured by Ikegai Tekko K.K.) at a cylinder temperature of 310° C., to obtain pellets. The results on the mold contamination caused by the pellets and the content of the MO components are set forth in Table 7.

Example D-1

The procedure of Comparative Example D-1 was repeated, except that the semiaromatic polyamide of Reference Example D-2 was used in place of the semiaromatic polyamide of Reference Example D-1.

Evaluation of Mold Contamination

The resins of the examples and the comparative examples were each subjected to injection molding by means of a spiral mold shown in FIG. 1 in accordance with the standard injection conditions for various resins in the same manner as described above, and the number of times of injection molding with which the gas vent was clogged was measured.

Comparative Example D-2

In a tumbler, 95 parts by weight of the semiaromatic polyamide of Reference Example D-1 and 5 parts by weight of an ethylene/α-olefin copolymer modified with maleic acid (Toughmer, available from Mitsui Petrochemical Industries, Ltd., crystallinity: 0%, $MFR_{190°\ C.}$: 4 g/10 min) were mixed. The resulting mixture was extruded by a usual twin-screw extruder (PCM-45, manufactured by Ikegai Tekko K.K.) at a cylinder temperature of 310° C., to obtain pellets. The results on the mold contamination caused by the pellets and the content of the MO components are set forth in Table 7.

Example D-2

The procedure of Comparative Example D-2 was repeated, except that the semiaromatic polyamide of Reference Example D-2 was used in place of the semiaromatic polyamide of Reference Example D-1.

Comparative Example D-3

In a tumbler, 81 parts by weight of the semiaromatic polyamide of the above reference example and 19 parts by weight of an ethylene/α-olefin copolymer modified with maleic acid (Toughmer, available from Mitsui Petrochemical Industries, Ltd., crystallinity: 0%, $MFR_{190°\ C.}$: 4 g/10 min) were mixed. To a usual twin-screw extruder (PCM-45, manufactured by Ikegai Tekko K.K.), the mixture was fed through a hopper and then 15 parts by weight of a glass fiber was further fed through a side feeder, followed by extrusion at a cylinder temperature of 310° C., to obtain pellets. The results on the mold contamination caused by the pellets and the content of the MO components are set forth in Table 7.

Example D-3

The procedure of Comparative Example D-3 was repeated, except that the semiaromatic polyamide of Reference Example D-2 was used in place of the semiaromatic polyamide of Reference Example D-1.

TABLE 7

|  | Ex. D-1 | Ex. D-2 | Ex. D-3 | Comp. Ex. D-1 | Comp. Ex. D-2 | Comp. Ex. D-3 |
|---|---|---|---|---|---|---|
| Content of MO component (wt %) | 0.08 | 0.08 | 0.09 | 0.40 | 0.42 | 0.40 |
| Evaluation of mold contamination | 9200 | 9400 | 9000 | 3300 | 3000 | 3100 |

TABLE 8

|  | Ex. E-1 | Comp. Ex. E-1 |
|---|---|---|
| Content of MO components (wt %) | 0.07 | 0.31 |
| Evaluation of mold contamination | 9,800 | 4,500 |

Reference Example E-1

In accordance with the process of Example A-1, 99.8 kg (859 mol) of 1,6-diaminohexane was polycondensed with 63.8 kg (384 mol) of terephthalic acid and simultaneously with 68.6 kg (470 mol) of adipic acid, to prepare pellets of a semiaromatic polyamide consisting of 45% by mol of recurring units derived from the 1,6-diaminohexane and the terephthalic acid and 55% by mol of recurring units derived from the 1,6-diaminohexane and the adipic acid.

The content of the MO components in the semiaromatic polyamide pellets was 0.45% by weight.

Reference Example E-2

The semiaromatic polyamide pellets of Reference Example E-1 and 300 parts by weight of boiling water (100° C.) based on 100 parts by weight of the semiaromatic polyamide pellets were introduced into a drum, and they were stirred for 24 hours to contact them with maintaining the temperature at 100° C.

Then, the semiaromatic polyamide pellets were separated from water and dried. The content of the MO components in the thus treated semiaromatic polyamide pellets was 0.05% by weight.

Comparative Example E-1

In a tumbler, 75 parts by weight of the semiaromatic polyamide of Reference Example E-1, 20 parts by weight of polyethylene modified with maleic acid and 5 parts by weight of nylon 12 were mixed. The resulting mixture was extruded by a usual twin-screw extruder (PCM-45, manufactured by Ikegai Tekko K.K.) at a cylinder temperature of 310° C., to obtain pellets.

Example E-1

The procedure of Comparative Example E-1 was repeated, except that the semiaromatic polyamide of Reference Example E-2 was used in place of the semiaromatic polyamide of Reference Example E-1.

Evaluation of Mold Contamination

The resins of the examples and the comparative examples were each subjected to injection molding by means of a spiral mold shown in FIG. 1 in accordance with the standard injection conditions for various resins in the same manner as described above, and the number of times of injection molding with which the gas vent was clogged was measured. The results are set forth in Table 8.

Reference Example F-1

In accordance with the process of Example A-1, 99.8 kg (859 mol) of 1,6-diaminohexane was polycondensed with 78.1 kg (470 mol) of terephthalic acid and simultaneously with 56.0 kg (384 mol) of adipic acid, to prepare pellets of a semiaromatic polyamide consisting of 55% by mol of recurring units derived from the 1,6-diaminohexane and the terephthalic acid and 45% by mol of recurring units derived from the 1,6-diaminohexane and the adipic acid.

The content of the MO components in the semiaromatic polyamide pellets was 0.35% by weight.

Reference Example F-2

The semiaromatic polyamide pellets of Reference Example F-1 and 300 parts by weight of boiling water (100° C.) based on 100 parts by weight of the semiaromatic polyamide pellets were introduced into a drum, and they were stirred for 24 hours to contact them with maintaining the temperature at 100° C.

Then, the semiaromatic polyamide pellets were separated from water and dried. The content of the MO components in the thus treated semiaromatic polyamide pellets was 0.05% by weight.

Examples F-1 to F-3

The components shown in Table 9 in the amounts (parts by weight) shown in the same table were mixed. The resulting mixture was fed to a twin-screw extruder of 65 mm diameter preset at a temperature of 320° C., melt kneaded and pelletized.

The resulting pellets were molded by means of a 2 oz in-line screw type injection molding machine preset at a temperature of 320° C., to evaluate mold contamination.

The results are set forth in Table 9.

Evaluation of Mold Contamination

The pellets were subjected to injection molding by means of a spiral mold shown in FIG. 1 in accordance with the standard injection conditions for various resins in the same manner as described above, and the number of times of injection molding with which the gas vent was clogged was measured.

Comparative Examples F-1 to F-3

The mold contamination was evaluated in the same manner as in the above examples, except that the compositions shown in Table 9 were used.

The results are set forth in Table 9.

TABLE 9

|  | Ex. F-1 | Comp. Ex. F-1 | Ex. F-2 | Comp. Ex. F-2 | Ex. F-3 | Comp. Ex. F-3 |
|---|---|---|---|---|---|---|
| Preparation example of polyamide | Ref.Ex. F-2 | Ref.Ex. F-1 | Ref.Ex. F-2 | Ref.Ex. F-1 | Ref.Ex. F-4 | Ref.Ex. F-3 |
| Polyamide | 38 | 38 | 49 | 49 | 38 | 38 |
| Organic flame retarder Polytribromostyrene | 18 | 18 | 30 | 30 | 38 | 38 |
| Inorganic auxiliary flame retardant Sodium antimonate | 4.0 | 4.0 | 6.0 | 6.0 | 4.0 | 4.0 |
| Fibrous reinforcement Glass fiber | 40 | 40 | 15 | 15 | 40 | 40 |
| Evaluation of mold contamination (No. of times of continuous molding) | 8200 | 3000 | 7800 | 1500 | 7800 | 700 |

Example G-1

Preparation of Prepolymer

A reactor was charged with 99.8 kg (859 mol) of 1,6-diaminohexane, 63.8 kg (384 mol) of terephthalic acid, 68.6 kg (470 mol) of adipic acid, 204 g (1.92 mol) of sodium hypophosphite as a catalyst, 1.3 kg (10.6 mol) of benzoic acid as a terminating reagent and 24 liters of water. The molar ratio (ratio of charge weight) of the terephthalic acid to the adipic acid was 45:55. After the reactor was purged with nitrogen, the reaction was carried out for 1 hour under the conditions of a temperature of 250° C. and a pressure of 35 kg/cm$^2$.

The reaction product produced in the reactor was flashed in air through a nozzle to perform solid-liquid separation and cooling at the same time, followed by drying, to obtain a prepolymer. The prepolymer had an intrinsic viscosity ($\eta$) of 0.15 dl/g, a melting point of 305° C. and a mean particle diameter of 300 $\mu$m.

The prepolymer of 40 kg was introduced into a dryer having an effective volume of 0.065 m$^3$ (paddle dryer, manufactured by Nara Kikai Seisakusho), heated from 15° C. to 240° C. over a period of 83 minutes and maintained at 240° C. for 18 minutes.

Thus, 36 kg of an aromatic polyamide prepolymer A having an intrinsic viscosity ($\eta$) of 0.70 dl/g was obtained.

Preparation of Aromatic Polyamide of High Polymerization Degree

The aromatic polyamide prepolymer A was continuously fed to a twin-screw extruder having a cylinder temperature of 350° C., a screw rotational speed of 200 rpm and a diameter of 57 mm at a feed rate of 100 kg/hr and subjected to melt polycondensation, to obtain the desired aromatic polyamide of high polymerization degree.

The resulting aromatic polyamide had an intrinsic viscosity ($\eta$) of 1.03 dl/g and a melting point of 310° C.

The content of the MO components in the semiaromatic polyamide pellets was 0.37% by weight.

The semiaromatic polyamides obtained in the above examples and comparative examples were evaluated on the mold contamination in the following manner.

Figure 2A:
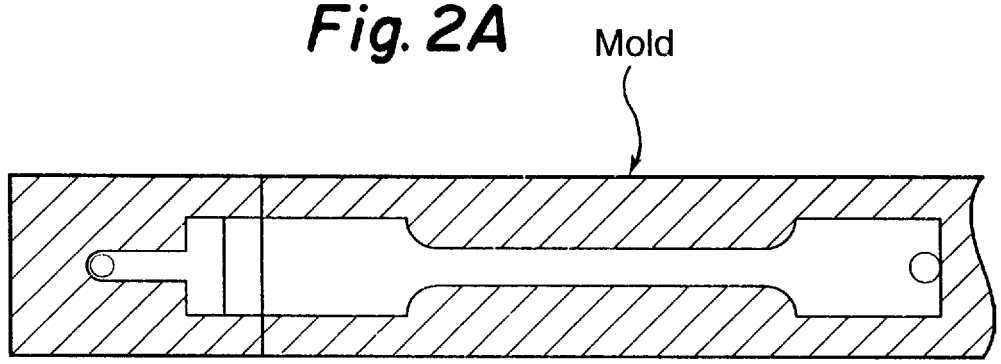
FIGS. 2A and 2B show a front view and a side view of a mold, respectively, for producing a specimen used in a second method of evaluating mold contamination.
Figure 2B:
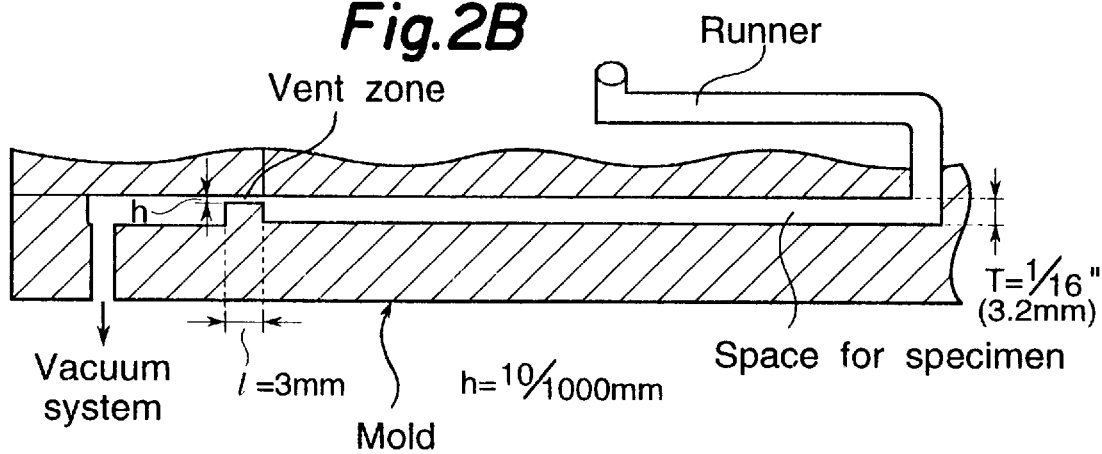

Evaluation 2 of Mold Contamination (1) As shown in FIGS. 2A and 2B, an air vent having a depth of 10$\mu$ and a width of 3 mm was provided at the end of a mold for preparing a tensile test specimen (ASTM specimen No. 1), and injection molding was carried out under the following molding conditions.

(2) Molding conditions
  a. Molding machine: SG50-MIII manufactured by Sumitomo Shipbuilding & Machinery Co., Ltd.
  b. Molding conditions
    Cylinder preset temperature: 330° C.
    Mold temperature: 120° C.
    Injection speed: 60 mm/sec (3) Judgment of vent clogging When molding of polyamide containing large amounts of MO components is repeated, the MO components accumulate in the vicinity of a vent to cause clogging of the vent.

When the vent is clogged, air hardly gets out of the mold to cause adiabatic compression of the polyamide resin at the final feed zone, whereby the temperature of the mold becomes high.

Figure 2C:
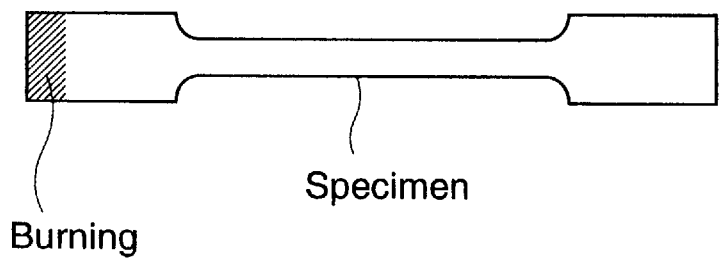
FIG. 2C illustrates the evaluation method.

When the temperature of the mold becomes high, the resin is carbonized and blackened, namely, "gas burning" is brought about, whereby the tip of the resulting specimen becomes black as shown in FIG. 2C.

Result of Evaluation

The number of shot times, with which the tip of the specimen became black because of the "gas burning", was measured. As a result, the polyamides obtained by the examples more rarely underwent "gas burning", as compared with the polyamides obtained in the comparative examples.

What is claimed is:

1. A semiaromatic polyamide having (A) recurring units derived from terephthalic acid and an aliphatic diamine of 4 to 12 carbon atoms, and optionally, (B) recurring units derived from isophthalic acid and an aliphatic diamine of 4 to 12 carbon atoms, (C) recurring units derived from an aliphatic dicarboxylic acid of 4 to 18 carbon atoms and an aliphatic.diamine of 4 to 12 carbon atoms and (D) recurring units derived from a lactam or an aminocarboxylic acid of 6 to 20 carbon atoms;

wherein said semiaromatic polyamide comprises 40 to 90% by mol of the recurring units (A), 0 to 50% by mol of the recurring units (B), 0 to 60% by mol of the recurring units (C) and 0% by mol of the recurring units (D), and the content of boiling water-soluble components (MO components) in the semiaromatic polyamide, as measured by immersing the polyamide in a boiling water at 100° C. for 24 hours, is not more than 0.25% by weight.

2. The semiaromatic polyamide as claimed in claim 1, wherein the content of boiling water-soluble components (MO components) in the semiaromatic polyamide is not more than 0.15% by weight.

3. A semiaromatic polyamide composition comprising:
  a semiaromatic polyamide as claimed in claim 1, which has (A) recurring units derived from terephthalic acid and an aliphatic diamine of 4 to 12 carbon atoms, and optionally, (B) recurring units derived from isophthalic acid and an aliphatic diamine of 4 to 12 carbon atoms, (C) recurring units derived from an aliphatic dicarboxylic acid of 4 to 18 carbon atoms and an aliphatic diamine of 4 to 12 carbon atoms and (D) recurring units derived from a lactam or an aminocarboxylic acid of 6 to 20 carbon atoms, and a fibrous reinforcement in an amount of 5 to 250 parts by weight based on 100 parts by weight of the semiaromatic polyamide;

wherein said semiaromatic polyamide comprises 40 to 90% by mol of the recurring units (A), 0 to 50% by mol of the recurring units (B), 0 to 60% by mol of the recurring units (C) and 0% by mol of the recurring units (D), and the content of boiling water-soluble components (MO components) in the semiaromatic polyamide, as measured by immersing the polyamide in a boiling water at 100° C. for 24 hours, is not more than 0.25% by weight.

4. The semiaromatic polyamide composition as claimed in claim 3, wherein the content of boiling water-soluble components (MO components) in the semiaromatic polyamide is not more than 0.15% by weight.

5. A semiaromatic polyamide composition comprising:

99 to 30% by weight of a semiaromatic polyamide as claimed in claim 1, which has (A) recurring units derived from terephthalic acid and an aliphatic diamine of 4 to 12 carbon atoms, and optionally, (B) recurring units derived from isophthalic acid and an aliphatic diamine of 4 to 12 carbon atoms, (C) recurring units derived from an aliphatic dicarboxylic acid of 4 to 18 carbon atoms and an aliphatic diamine of 4 to 12 carbon atoms and (D) recurring units derived from a lactam or an aminocarboxylic acid of 6 to 20 carbon atoms, and 1 to 70% by weight of a modified elastomeric polymer and/or an ionomer resin;

wherein said semiaromatic polyamide comprises 40 to 90% by mol of the recurring units (A), 0 to 50% by mol of the recurring units (B), 0 to 60% by mol of the recurring units (C) and 0% by mol of the recurring units, and the content of boiling water-soluble components (MO components) in the semiaromatic polyamide, as measured by immersing the polyamide in a boiling water at 100° C. for 24 hours, is not more than 0.25% by weight.

6. The semiaromatic polyamide composition as claimed in claim 5, said semiaromatic polyamide composition further containing a fibrous reinforcement.

7. The semiaromatic polyamide composition as claimed in claim 5 or claim 6, wherein the content of boiling water-soluble components (MO components) in the semiaromatic polyamide is not more than 0.15% by weight.

8. A semiaromatic polyamide composition comprising:

99 to 30% by weight of a semiaromatic polyamide as claimed in claim 1, which has (A) recurring units derived from terephthalic acid and an aliphatic diamine of 4 to 12 carbon atoms, and optionally, (B) recurring units derived from isophthalic acid and an aliphatic diamine of 4 to 12 carbon atoms, (C) recurring units derived from an aliphatic dicarboxylic acid of 4 to 18 carbon atoms and an aliphatic diamine of 4 to 12 carbon atoms and (D) recurring units derived from a lactam or an aminocarboxylic acid of 6 to 20 carbon atoms, and 1 to 70% by weight of an aliphatic polyamide;

wherein said semiaromatic polyamide comprises 40to 90% by mol of the recurring units (A), 0 to 50% by mol of the recurring units (B), 0 to 60% by mol of the recurring units (C) and 0% by mol of the recurring units, and the content of boiling water-soluble components (MO components) in the semiaromatic polyamide, as measured by immersing the polyamide in a boiling water at 100° C. for 24 hours, is not more than 0.25% by weight.

9. The semiaromatic polyamide composition as claimed in claim 8, said semiaromatic polyamide composition further containing a modified elastomeric polymer and/or an ionomer resin.

10. The semiaromatic polyamide composition as claimed in claim 9, said semiaromatic polyamide composition further containing a fibrous reinforcement.

11. The semiaromatic polyamide composition as claimed in claim 8, claim 9 or claim 10, wherein the content of boiling water-soluble components (MO components) in the semiaromatic polyamide is not more than 0.15% by weight.

12. A semiaromatic polyamide composition comprising:

a semiaromatic polyamide composition as claimed in any one of claims 3, 5 or 8, and a flame retardant.

13. The semiaromatic polyamide composition as claimed in claim 12, wherein the flame retardant is an organic flame retardant and/or an inorganic auxiliary flame retardant.

14. The semiaromatic polyamide composition as claimed in claim 13, wherein the organic flame retardant is halogenated polystyrene and/or a condensate of halogenated phenol and the inorganic auxiliary flame retardant sodium antimonate.

15. A semiaromatic polyamide composition comprising:

a semiaromatic polyamide as claimed in claim 1 or claim 2, which has (A) recurring units derived from terephthalic acid and an aliphatic diamine of 4 to 12 carbon atoms, and optionally, (B) recurring units derived from isophthalic acid and an aliphatic diamine of 4 to 12 carbon atoms, (C) recurring units derived from an aliphatic dicarboxylic acid of 4 to 18 carbon atoms and an aliphatic diamine of 4 to 12 carbon atoms and (D) recurring units derived from a lactam of 6 to 20 carbon atoms or an aminocarboxylic acid, and a flame retardant;

wherein said semiaromatic polyamide comprises 40 to 90% by mol of the recurring units (A), 0 to 50% by mol of the recurring units (B), 0 to 60% by mol of the recurring units (C) and 0% by mol of the recurring units (D), and the content of boiling water-soluble components (MO components) in the semiaromatic polyamide, as measured by immersing the polyamide in a boiling water at 100° C. for 24 hours, is not more than 0.25% by weight.

16. The semiaromatic polyamide composition as claimed in claim 15, wherein the flame retardant is an organic flame retardant and/or an inorganic auxiliary flame retardant.

17. The semiaromatic polyamide composition as claimed in claim 16, wherein the organic flame retardant is halogenated polystyrene and/or a condensate of halogenated phenol and the inorganic auxiliary flame retardant is sodium antimonate.

18. A process for preparing a semiaromatic polyamide, comprising the steps of:

bringing terephthalic acid and optionally isophthalic acid and an aliphatic dicarboxylic acid of 4 to 18 carbon atoms into contact with an aliphatic diamine of 4 to 12 carbon atoms, to prepare a semiaromatic polyamide comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0 % by mol of (D) recurring units derived from the lactam of 6 to 20 carbon atoms or the aminocarboxylic acid, and bringing the semiaromatic polyamide into contact with an aqueous medium to decrease the content of boiling water-soluble components (MO components) in the semiaromatic polyamide to not more than 0.25% by weight.

19. The process for preparing a semiaromatic polyamide as claimed in claim 18, wherein the temperature of the water to be brought into contact with the semiaromatic polyamide is in the range of 50 to 100° C.

20. The process for preparing a semiaromatic polyamide as claimed in claim 18 or claim 19, wherein the semiaromatic polyamide is brought into contact with the water for a period of 10 to 120 minutes.

21. The process for preparing a semiaromatic polyamide as claimed in claim 18, wherein the semiaromatic polyamide has an intrinsic viscosity ($\eta$), as measured in a concentrated sulfuric acid at 30° C., of 0.7 to 2.0 dl/g.

22. A process for preparing a semiaromatic polyamide, comprising the steps of:

bringing terephthalic acid and optionally isophthalic acid and an aliphatic dicarboxylic acid of 4 to 18 carbon atoms into contact with an aliphatic diamine of 4 to 12 carbon atoms, to prepare a semiaromatic polyamide prepolymer comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0% by mol of (D) recurring units derived from the lactam or the aminocarboxylic acid of 6 to 20 carbon atoms, bringing the semiaromatic polyamide prepolymer into contact with water, drying the semiaromatic polyamide prepolymer, and post polymerizing the dry semiaromatic polyamide prepolymer to decrease the content of boiling water-soluble components (MO components) in the semiaromatic polyamide to not more than 0.25% by weight.

23. The process for preparing a semiaromatic polyamide as claimed in claim 22, wherein the dry semiaromatic polyamide prepolymer is melted by heating and the molten semiaromatic polyamide prepolymer is polycondensed with applying thereto a shear stress.

24. The process for preparing a semiaromatic polyamide as claimed in claim 22, wherein the temperature of the water to be brought into contact with the semiaromatic polyamide prepolymer is in the range of 50° to 100° C.

25. The process for preparing a semiaromatic polyamide as claimed in any one of claims 22 to 24, wherein the semiaromatic polyamide prepolymer is brought into contact with the water for a period of 10 to 120 minutes.

26. The process for preparing a semiaromatic polyamide as claimed in claim 22, wherein the semiaromatic polyamide prepolymer has an intrinsic viscosity ($\eta$), as measured in a concentrated sulfuric acid at 30° C., of 0.05 to 0.6 dl/g.

27. The process for preparing a semiaromatic polyamide as claimed in claim 22, wherein a semiaromatic polyamide resin obtained by the post polymerization of the semiaromatic polyamide prepolymer has an intrinsic viscosity ($\eta$), as measured in a concentrated sulfuric acid at 30° C., of 0.9 to 2.5 dl/g.

28. The process for preparing a semiaromatic polyamide as claimed in claim 22, wherein the dicarboxylic acid is brought into contact with the diamine in the presence of a catalyst and a terminating reagent to prepare the semiaromatic polyamide prepolymer.

29. The process for preparing a semiaromatic polyamide as claimed in claim 22, wherein the semiaromatic polyamide prepolymer is brought into contact with the water in an amount of 1 to 10 times as much as the volume of the prepolymer.

30. A process for preparing a semiaromatic polyamide, comprising the steps of:

bringing terephthalic acid and optionally isophthalic acid and an aliphatic dicarboxylic acid of 4 to 18 carbon atoms into contact with an aliphatic diamine of 4 to 12 carbon atoms, to prepare a semiaromatic polyamide comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0% by mol of (D) recurring units derived from the lactam or the aminocarboxylic acid of 6 to 20 carbon atoms, and melt extruding the semiaromatic polyamide with supplying an inert gas into the polyamide resin to decrease the content of boiling water-soluble components (MO components) in the semiaromatic polyamide.

31. A process for preparing a semiaromatic polyamide, comprising the steps of:

bringing terephthalic acid and optionally isophthalic acid and an aliphatic dicarboxylic acid of 4 to 18 carbon atoms into contact with an aliphatic diamine of 4 to 12 carbon atoms, to prepare a semiaromatic polyamide prepolymer comprising 40 to 90% by mol of (A) recurring units derived from the terephthalic acid and the aliphatic diamine of 4 to 12 carbon atoms, 0 to 50% by mol of (B) recurring units derived from the isophthalic acid and the aliphatic diamine of 4 to 12 carbon atoms, 0 to 60% by mol of (C) recurring units derived from the aliphatic dicarboxylic acid of 4 to 18 carbon atoms and the aliphatic diamine of 4 to 12 carbon atoms and 0% by mol of (D) recurring units derived from the lactam or the aminocarboxylic acid of 6 to 20 carbon atoms, subjecting the semiaromatic polyamide prepolymer to solid phase polymerization, and post polymerizing the semiaromatic polyamide prepolymer by an extruder to decrease the content of boiling water-soluble components (MO components) in the semiaromatic polyamide.

* * * * *

UNITED STATES PATENT AND TRADEMARK OFFICE
CERTIFICATE OF CORRECTION

PATENT NO. : 5,849,826
DATED : December 15, 1998
INVENTOR(S) : Yoshimasa OGO, et al.

It is certified that error appears in the above-indentified patent and that said Letters Patent is hereby corrected as shown below:

Column 1, immediately following the Title of the Invention and before line 5, insert, --CROSS-REFERENCE TO RELATED INVENTION This application is the U.S. National Stage under 35 U.S.C. 371, of Application No. PCT/JP96/03107 filed October 24, 1996.--

Signed and Sealed this

Thirty-first Day of October, 2000

Attest:

Q. TODD DICKINSON

*Attesting Officer*  *Director of Patents and Trademarks*